US012619346B1

(12) United States Patent
Salter et al.

(10) Patent No.: US 12,619,346 B1
(45) Date of Patent: May 5, 2026

(54) DISPLAYING CONTENT BASED ON DETECTING AN ASSOCIATED CONTEXT IN A PHYSICAL ENVIRONMENT

(71) Applicant: Apple Inc., Cupertino, CA (US)

(72) Inventors: Thomas G. Salter, San Francisco, CA (US); Jeffrey S. Norris, Saratoga, CA (US); Christopher I. Word, San Francisco, CA (US); Michael J. Rockwell, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/898,074

(22) Filed: Sep. 26, 2024

Related U.S. Application Data

(60) Provisional application No. 63/586,986, filed on Sep. 29, 2023.

(51) Int. Cl.
| | |
|---|---|
| *G06F 3/0487* | (2013.01) |
| *G02B 27/00* | (2006.01) |
| *G06F 3/01* | (2006.01) |
| *G06F 3/048* | (2013.01) |
| *G06F 3/14* | (2006.01) |

(52) U.S. Cl.
CPC .......... *G06F 3/0487* (2013.01); *G02B 27/00* (2013.01); *G06F 3/012* (2013.01); *G06F 3/013* (2013.01); *G06F 3/048* (2013.01); *G06F 3/14* (2013.01)

(58) Field of Classification Search
CPC ........ G06F 3/0387; G06F 3/012; G06F 3/013; G06F 3/048; G06F 3/14; G06F 3/0487; G02B 27/00
See application file for complete search history.

(56) References Cited

U.S. PATENT DOCUMENTS

| | | | |
|---|---|---|---|
| 8,509,483 | B2 | 8/2013 | Lawrence |
| 10,162,308 | B2 | 12/2018 | Du |
| 11,287,659 | B2 | 3/2022 | Hoover et al. |
| 11,328,484 | B2 | 5/2022 | Powderly et al. |
| 11,804,014 | B1 | 10/2023 | Casaburo et al. |
| 2015/0301797 | A1 | 10/2015 | Miller |
| 2016/0048311 | A1 | 2/2016 | Purvis et al. |
| 2016/0291922 | A1 | 10/2016 | Montgomerie et al. |
| 2018/0130260 | A1 | 5/2018 | Schmirler et al. |

(Continued)

OTHER PUBLICATIONS

Notice of Allowance received for U.S. Appl. No. 16/845,461, mailed on Jul. 29, 2023, 10 pages.

(Continued)

*Primary Examiner* — Brent D Castiaux
(74) *Attorney, Agent, or Firm* — Kubota & Basol LLP

(57) ABSTRACT

Some examples of the disclosure are directed to systems and methods for displaying content such as a user interface element of an application executing on the electronic device upon detecting a context (e.g., detecting a physical object and optionally the satisfaction of one or more criteria) for displaying the user interface element in a three-dimensional environment presented at an electronic device. Examples of the disclosure are directed to improving the user experience by automatically displaying a user interface element when certain conditions are satisfied, such as when the context of the three-dimensional environment is appropriate (e.g., the context for displaying the user interface element is detected).

24 Claims, 11 Drawing Sheets

(56) References Cited

U.S. PATENT DOCUMENTS

| 2018/0322706 | A1 | 11/2018 | Drouin et al. | |
|---|---|---|---|---|
| 2019/0213792 | A1 | 7/2019 | Jakubzak et al. | |
| 2019/0339840 | A1 | 11/2019 | Park et al. | |
| 2019/0371279 | A1* | 12/2019 | Mak | G09G 5/373 |
| 2019/0392640 | A1 | 12/2019 | Qian et al. | |
| 2020/0320794 | A1 | 10/2020 | Huang et al. | |
| 2023/0139337 | A1* | 5/2023 | Noam | G06F 3/0231 |
| | | | | 345/156 |

OTHER PUBLICATIONS

Non-Final Office Action received for U.S. Appl. No. 16/845,461, mailed on Apr. 6, 2021, 13 pages.

Non-Final Office Action received for U.S. Appl. No. 16/845,461, mailed on Jan. 24, 2023, 14 pages.

Final Office Action received for U.S. Appl. No. 16/845,461, mailed on Aug. 12, 2021, 15 pages.

Non-Final Office Action received for U.S. Appl. No. 16/845,461, mailed on Jan. 24, 2022, 15 pages.

Examiner Initiated Interview Summary received for U.S. Appl. No. 16/845,461, mailed on Jul. 6, 2021, 3 pages.

Corrected Notice of Allowability received for U.S. Appl. No. 16/845,461, mailed on Aug. 17, 2022, 5 pages.

Notice of Allowance received for U.S. Appl. No. 16/845,461, mailed on Jun. 8, 2022, 8 pages.

Chen, et al., "Context-Aware Mixed Reality: A Learning-Based Framework for Semantic-Level Interaction", Computer Graphics Forum, vol. 39, No. 1, retrieved from <https://onlinelibrary.wiley.com/doi/full/10.1111/cgf.13887>, 2020, pp. 484-496.

Gal, et al., "FLARE: Fast layout for augmented reality applications", retrieved from the Internet <https://www.microsoft.com/en-us/research/wp-content/uploads/2016/02/layoutopt_short_optimized.pdf>, 2014, 6 pages.

Sayer, Jason, ""Hyper-Reality" Visualized in Medellín Envisions Capitalism Enveloping the City and Daily Life", Retrieved from: <https://www.archpaper.com/2016/06/hyper-reality-keiichi-matsuda/>, Jun. 1, 2016, 6 pages.

* cited by examiner

Device
201

600

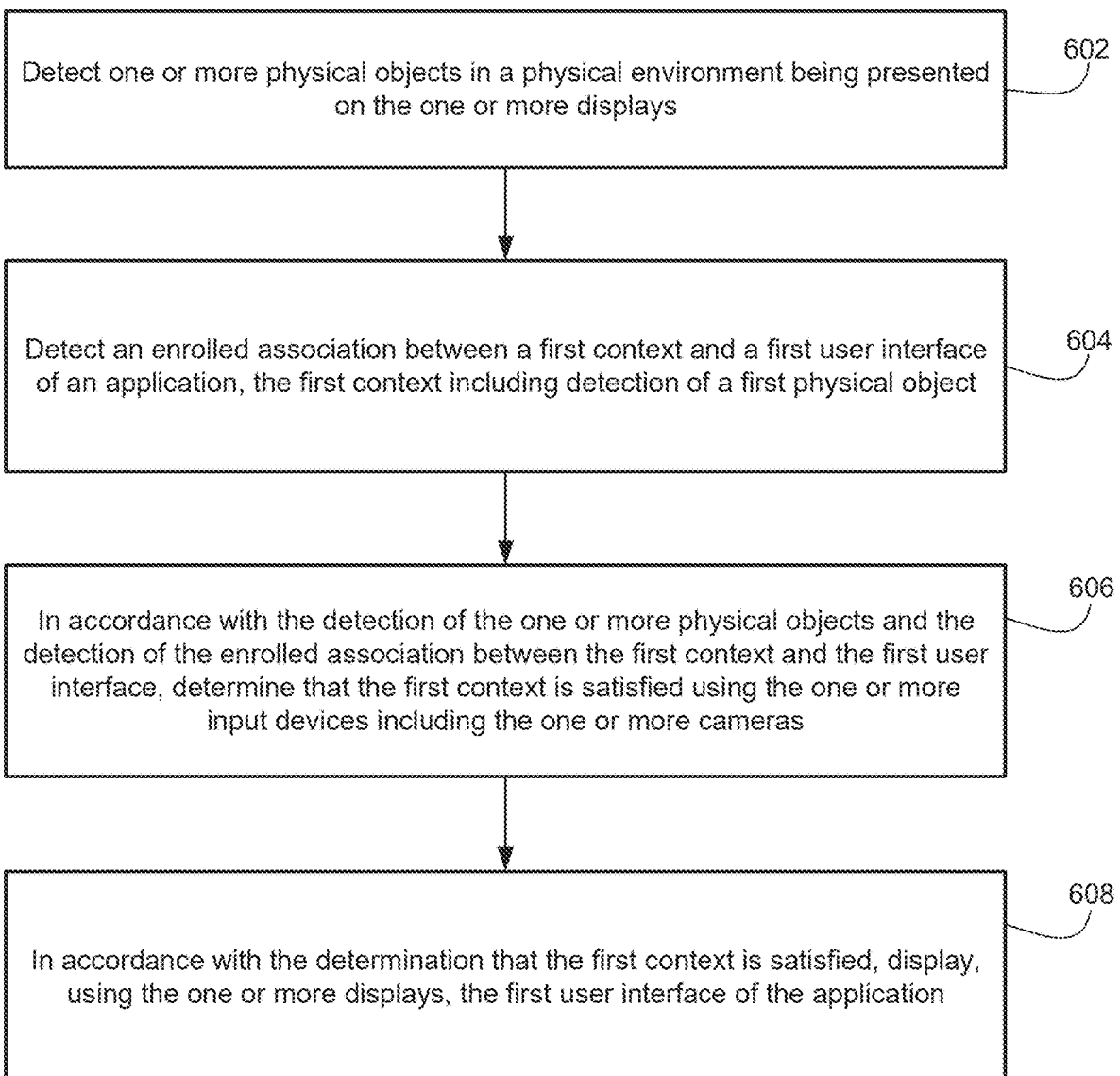

Detect one or more physical objects in a physical environment being presented on the one or more displays — 602

Detect an enrolled association between a first context and a first user interface of an application, the first context including detection of a first physical object — 604

In accordance with the detection of the one or more physical objects and the detection of the enrolled association between the first context and the first user interface, determine that the first context is satisfied using the one or more input devices including the one or more cameras — 606

In accordance with the determination that the first context is satisfied, display, using the one or more displays, the first user interface of the application — 608

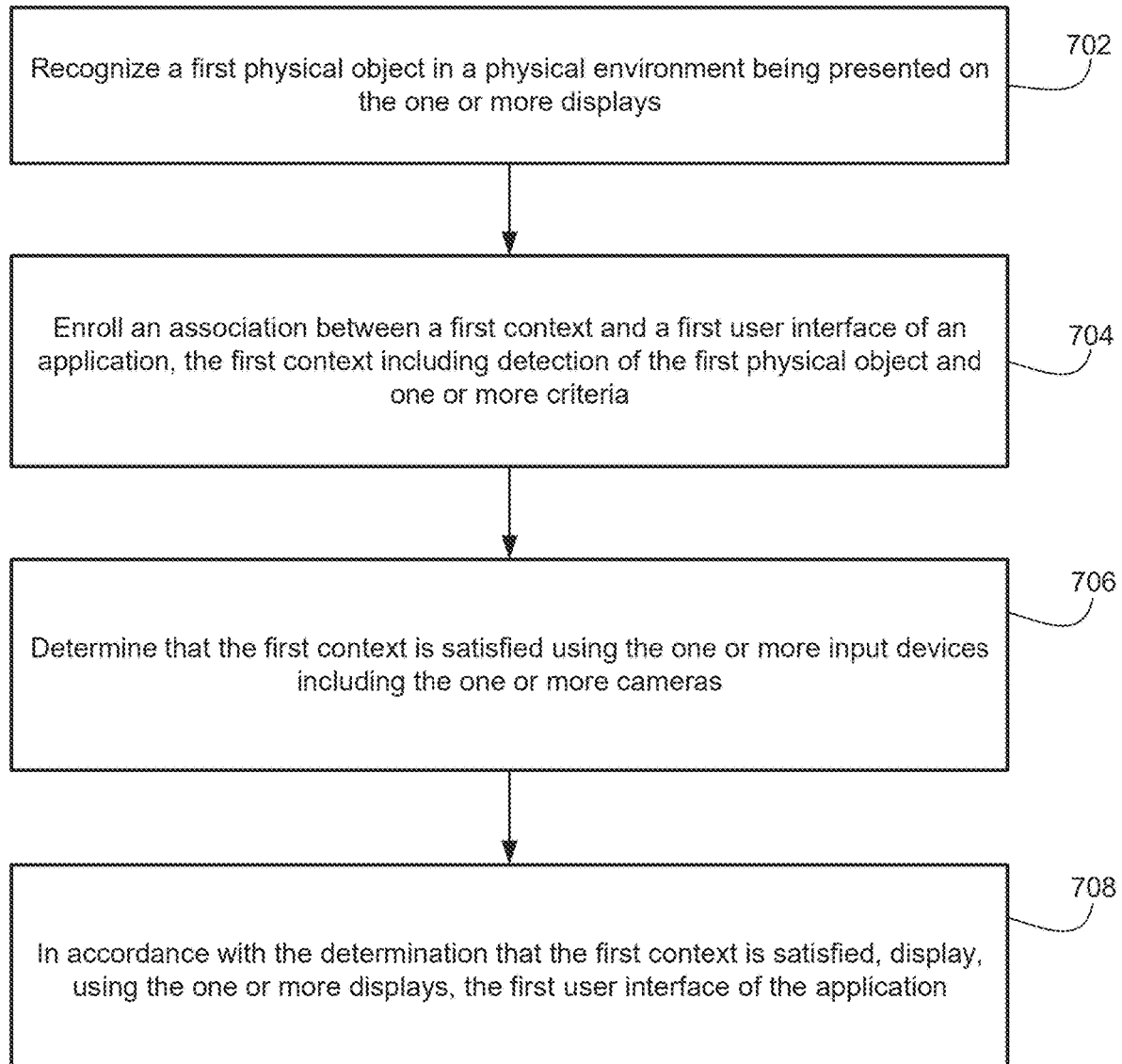

702

Recognize a first physical object in a physical environment being presented on the one or more displays

704

Enroll an association between a first context and a first user interface of an application, the first context including detection of the first physical object and one or more criteria

706

Determine that the first context is satisfied using the one or more input devices including the one or more cameras

708

In accordance with the determination that the first context is satisfied, display, using the one or more displays, the first user interface of the application

FIG. 7

DISPLAYING CONTENT BASED ON DETECTING AN ASSOCIATED CONTEXT IN A PHYSICAL ENVIRONMENT

CROSS-REFERENCE TO RELATED APPLICATIONS

This application claims the benefit of U.S. Provisional Application No. 63/586,986, filed Sep. 29, 2023, the entire disclosure of which is herein incorporated by reference for all purposes.

FIELD OF THE DISCLOSURE

This relates generally to systems and methods of displaying content such as user interface elements of an application based on detecting an associated context in a physical environment.

BACKGROUND OF THE DISCLOSURE

Some computer graphical environments provide two-dimensional and/or three-dimensional environments where at least some objects displayed for a user's viewing are virtual and generated by a computer. In some examples, a physical environment (e.g., including one or more physical objects) is presented, optionally along with one or more virtual objects, in a three-dimensional environment.

SUMMARY OF THE DISCLOSURE

Some examples of the disclosure are directed to systems and methods for displaying content such as one or more user interface elements of an application executing on the electronic device based on detection of one or more contexts (e.g., detecting a physical object and optionally the satisfaction of one or more criteria) in a computer-generated environment. In some examples, the electronic device captures, via one or more cameras, a portion of one or more physical environments (e.g., indoor and outdoor environments) in the field of view of the one or more cameras of the electronic device, and presents, via the one or more displays, representations of the one or more physical objects within the one or more physical environment. In some examples, the electronic device detects user input, via one or more input devices, to enroll an association between a specific physical object (e.g., closet or window), optionally one or more criteria, and a user interface of an application (e.g., a weather application and/or reminder application). Upon enrolling the association, a context including detection of the specific physical object and the optional satisfaction of one or more criteria is established. In other examples, the electronic device detects user input directed at opting into a pre-enrolled association between a generic physical object (e.g., a generic window or window-like object that includes a transparent portion), optionally one or more criteria, and a user interface of an application. Upon opting into the pre-enrolled associations, a context including the generic physical object and the optional satisfaction of one or more criteria is established. In some examples, more than one context is associated with a physical object.

In some examples, after any associations between contexts and user interface elements have been enrolled, and/or after any pre-enrolled associations between contexts and user interface elements have been accepted, the electronic device detects a physical object in the field of view of the one or more cameras, and determines whether any contexts associated with that physical object are detected. In response to detection of a context, the electronic device displays, via one or more displays, an associated user interface element of an application.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 6 is a flow diagram illustrating an example process for displaying content such as one or more user interface elements of an application executing on the electronic device based on detection of one or more pre-enrolled contexts according to some examples of the disclosure.

FIG. 7 is a flow diagram illustrating an example process for displaying content such as one or more user interface elements of an application executing on the electronic device based on detection of one or more user-generated contexts according to some examples of the disclosure.

DETAILED DESCRIPTION

Some examples of the disclosure are directed to systems and methods for displaying content such as one or more user interface elements of an application executing on the electronic device based on detection of one or more contexts (e.g., detecting a physical object and optionally the satisfaction of one or more criteria) in a computer-generated environment. In some examples, the electronic device captures, via one or more cameras, a portion of one or more physical environment (e.g., indoor and outdoor environments) in the field of view of the one or more cameras of the electronic device, and presents, via the one or more displays, representations of the one or more physical objects within the one or more physical environment. In some examples, the electronic device detects user input, via one or more input devices, to enroll an association between a specific physical object (e.g., closet or window), optionally one or more criteria, and a user interface of an application (e.g., weather application and/or reminder application). Upon enrolling the association, a context including detection of the specific physical object and the optional satisfaction of one or more criteria is established. In other examples, the electronic device detects user input directed at opting into a pre-enrolled association between a generic physical object (e.g., a generic window or window-like object that includes a transparent portion), optionally one or more criteria, and a user interface of an application. Upon opting into the pre-enrolled associations, a context including the generic physical object and the optional satisfaction of one or more criteria is established. In some examples, more than one context is associated with a physical object.

In some examples, after any associations between contexts and user interface elements have been enrolled, and/or after any pre-enrolled associations between contexts and user interface elements have been accepted, the electronic device detects a physical object in the field of view of the one or more cameras and determines whether any contexts associated with that physical object are detected. In response to detection of a context, the electronic device displays, via one or more displays, an associated user interface element of an application.

Figure 1:
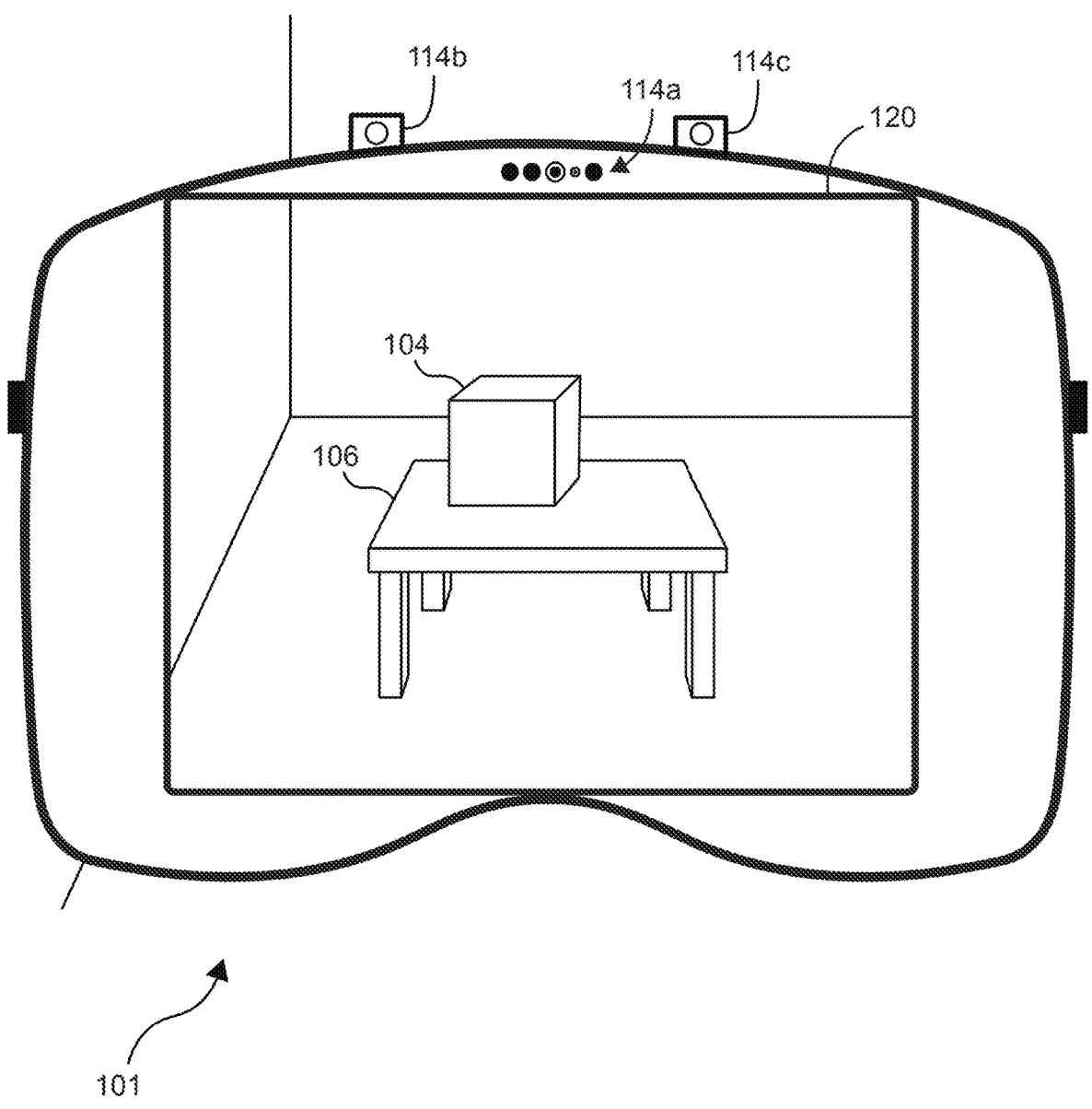
FIG. 1 illustrates an electronic device presenting an extended reality environment according to some examples of the disclosure.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114*b* and 114*c*.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
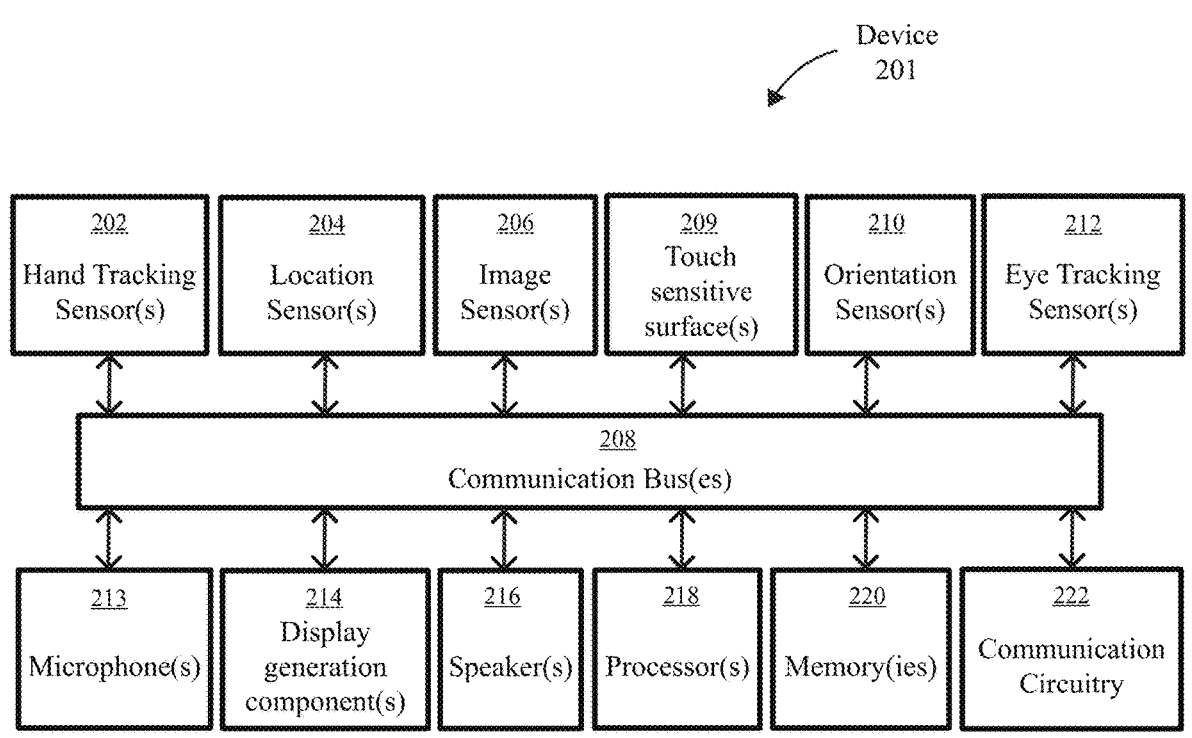
FIG. 2 illustrates a block diagram of an example architecture for an electronic device according to some examples of the disclosure.

FIG. 2 illustrates a block diagram of an example architecture for an electronic device 201 according to some examples of the disclosure. In some examples, electronic device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114a and/or external image sensors 114b and 114c in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global positioning system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, torso, or head of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Attention is now directed to displaying content such as a user interface element of an application executing on the electronic device upon detecting a context (e.g., detecting a physical object and optionally the satisfaction of one or more criteria) for displaying the user interface element in a three-dimensional environment presented at an electronic device (e.g., corresponding to electronic device 201). Examples of the disclosure are directed to improving the user experience by automatically displaying a user interface element when certain conditions are satisfied, such as when the context of the three-dimensional environment is appropriate (e.g., the context for displaying the user interface element is detected).

In some examples, while a portion of a physical environment is visible in the three-dimensional environment, a user of the electronic device can utilize the electronic device to enroll or register an association between a specific physical object in the physical environment (e.g., a window), an optional criterion or a set of criteria, and one or more user interface elements of one or more applications (e.g., a weather application) operating on the electronic device (e.g., electronic device 201). With this enrollment, a context (e.g., the specific physical object and the optional one or more criteria) of a first type is established and associated with a user interface element, and detection of this context becomes the trigger for displaying the user interface element. In some examples, the user can enroll an association between a generalized or generic physical object in the physical environment (e.g., a generic window or window-like object that includes a transparent portion), an optional criterion or a set of criteria, and one or more user interface elements of one or more applications. With this enrollment, a context (e.g., the generic physical object and the optional one or more criteria) of a second type is established and associated with a user interface element, and detection of this context becomes the trigger for displaying the user interface element. In some examples, an association between a generalized or generic physical object, an optional criterion or a set of criteria, and one or more user interface elements of one or more applications can be pre-enrolled (e.g., previously enrolled by a software developer or person other than the user, prior to any intentional user enrollments). With this pre-enrollment, a context of a third type is established and associated with a user interface element, and detection of this context becomes the trigger for displaying the user interface element. With pre-enrollments, the user can provide inputs to opt in or opt out of any pre-enrolled associations between the generic physical object, the optional criterion or the set of criteria, and the one or more user interface elements of the one or more application.

After any pre-enrollments are accepted and/or user-created enrollments are completed by the user, the electronic device can visually detect and recognize (e.g., via the field of view of the one or more cameras of electronic device 201) a physical object in the physical environment (e.g., a window in the field of view of the one or more cameras of the electronic device 201) as one of the physical objects (specific or generic) in the enrolled associations between contexts (physical objects and optional one or more criteria) and user interface elements. The electronic device can then determine whether the criterion or the set of criteria associated with the recognized physical object, if any, is satisfied. If the optional criterion or criteria associated with the recognized physical object satisfied, the context for displaying the user interface element is detected. Thereafter, in response to detection of the context, the electronic device can display the one or more user interface elements of the one or more applications associated with the detected context.

FIGS. 3A-3E illustrate an electronic device displaying one or more weather user interface elements when one or more contexts are detected according to some examples of the disclosure. The electronic device 301 may be similar to electronic device 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3E, a user is optionally wearing the electronic device 301 in a three-dimensional environment 350 that can be defined by X, Y and Z axes as viewed from a perspective of the electronic device (e.g., a viewpoint associated with the user of the electronic device 301). The electronic device 301 can be configured to be movable (e.g., with six degrees of freedom) based on the movement of the user (e.g., the head of the user), such that the electronic device 301 may be moved in the X, Y or Z directions, the roll direction, the pitch direction, and/or the yaw direction. Although X, Y, and Z directions are described, electronic device 301 may use any suitable coordinate system to track position and/or orientation of electronic device 301. In some examples, the electronic device 301 can be located within a region of an indoor environment (e.g., in a specific room). In some examples, the electronic device can be moved into a new region within the indoor environment (e.g., into a different room). In some examples, the field of view of the one or more cameras of the electronic device 301 updates as the electronic device is being moved.

Figure 3A:
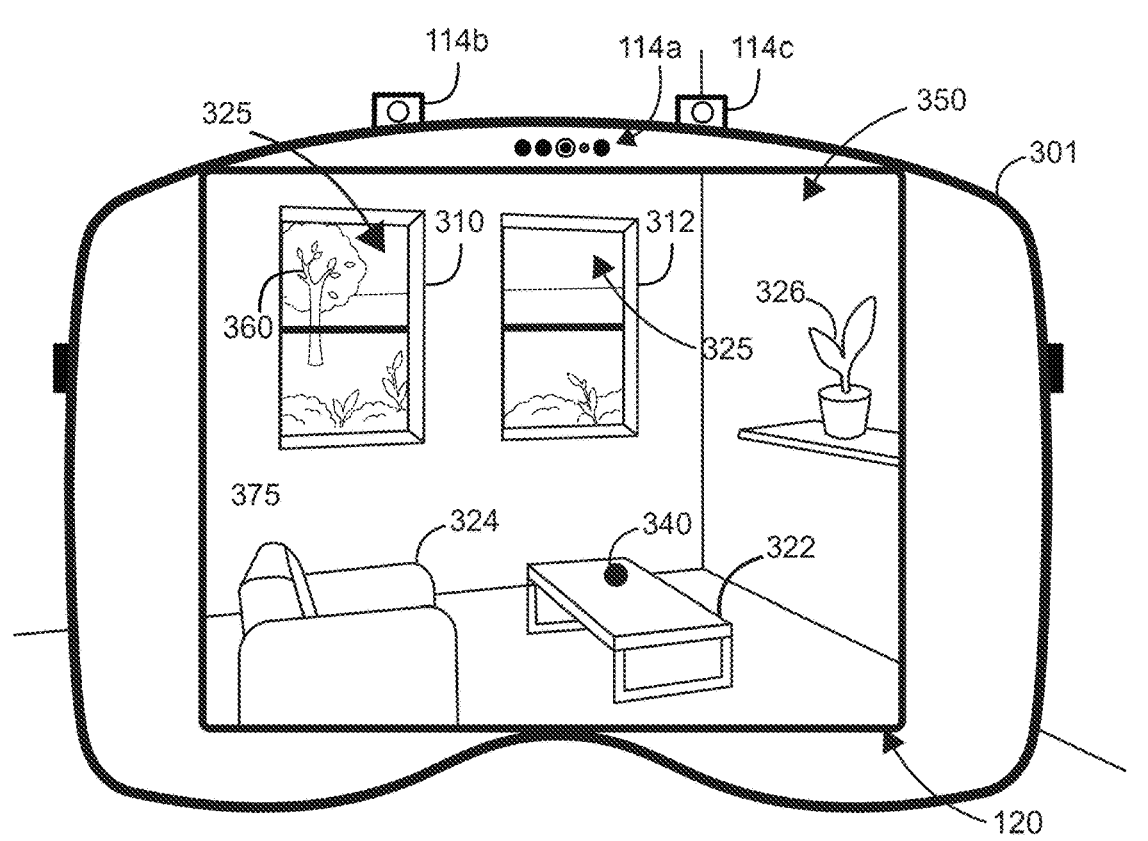
FIGS. 3A-3E illustrate an electronic device displaying one or more weather user interface elements when one or more contexts are detected according to some examples of the disclosure.
Figure 3A:
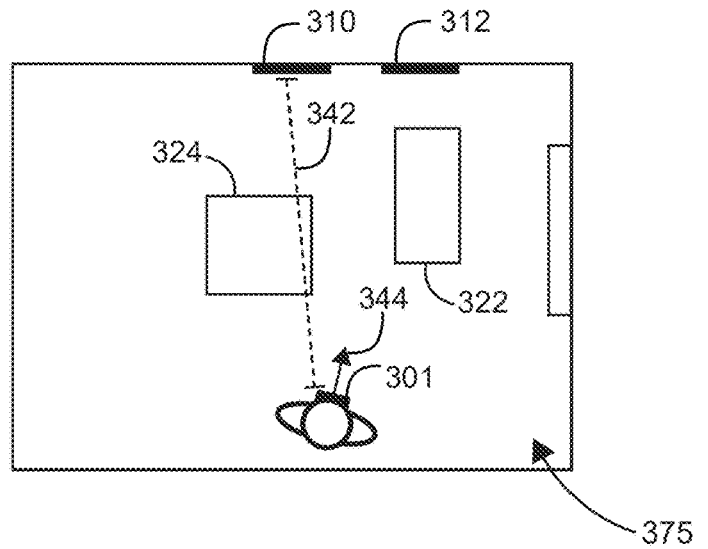

FIG. 3A illustrates an electronic device that has detected one or more physical objects, but has not yet determined that a context has been detected, and has not yet displayed one or more user interface elements of a weather application (or other application) according to some examples of the disclosure. As shown in FIG. 3A, the electronic device 301 may be positioned in a physical environment (e.g., an indoor environment) that includes a plurality of real-world objects.

In the example of FIG. 3A, the electronic device 301 may be oriented toward physical objects within the indoor physical environment 375, such as window 312, and may present representations of the physical objects. In some examples, the three-dimensional environment 350 presented using the electronic device 301 optionally includes captured portions of the physical environment 375 surrounding the electronic device 301, such as representations of table 322 or sofa 324 in the field of view of the one or more cameras of the electronic device. In some examples, the field of view of the user may be a subset of the field of view of the one or more cameras, and the field of view of the one or more cameras can encompass a larger portion of the three-dimensional environment 350 than the field of view of the user. In other examples, the field of view of the user can be equivalent to the field of view of the one or more transparent or translucent displays, and a portion of the three-dimensional environment 350 may be presented in the field of view of the one or more transparent or translucent displays. Accordingly, although the visible field of view presented to the user in the electronic device may be described herein as being provided by one or more cameras (e.g., of the electronic device 301), it is understood in all instances that the presented field of view is not so limited, and that the field of view can alternatively be based on the field of view of one or more translucent or transparent displays. In some examples, the representations of the physical objects in the field of view of one or more cameras can include portions of a physical environment viewed through a transparent or translucent display of electronic device 301. Note that although the example of FIG. 3A illustrates an electronic device operating in an indoor environment, in other examples the electronic device may determine the detection of contexts and display associated user interface elements only in limited indoor environments, such as in a home or an office, or only in certain rooms in a home or an office. However, in still other examples, the electronic device may determine the detection of contexts and display associated user interface elements in other indoor environments, such as a hotel room, a friend's home, a non-public space, and the like, or outdoor environments. In the example shown in the bottom portion of FIG. 3A, a top-down view of a portion of the physical environment 375 is depicted that showcases the electronic device 301 (or user) having an orientation 344 directed towards window 312 that is adjacent to window 310 and positioned within a threshold distance 342 from the window 310. The top-down view also includes a plurality of physical objects such as table 322 and sofa 324, both of which are in the field of view of one or more cameras of the electronic device.

In some examples, as shown in FIG. 3A, the presented three-dimensional environment 350 includes a portion of an indoor environment and a portion of an outside environment that are separated by a physical object that acts as a boundary between the indoor and outside environments; however, both of the indoor and outside environments may be visible in the field of view of the one or more cameras and presented within the three-dimensional environment. In some examples, as in the example of FIG. 3A, the physical object acting as a boundary, opening or gateway is a transparent or translucent physical object (e.g., a window 310 or 312) that allows visibility of one or more physical objects located directly or partially behind the transparent or translucent physical object (e.g., in the outside environment). In this example, any of the physical objects in the field of view of the one or more cameras including the one or more transparent or translucent physical objects, the physical objects directly or partially behind the transparent or transparent physical objects located in an outside environment, and/or the physical objects located in an indoor environment can be candidates for inclusion in a context. It should be understood that although a boundary in the form of windows 310 and 312 are shown in the example of FIG. 3A, in other examples the boundary can include window-like physical objects with transparent portions such as sliding glass doors, French doors, skylights, and the like.

As mentioned above, an association between a specific detected physical object, an optional criterion or a set of criteria, and a user interface element of an application can be enrolled, and in doing so, a context (the specific physical object and the optional one or more criteria) for displaying the user interface element is established. Alternatively, an association between a generic physical object, an optional criterion or a set of criteria, and a user interface element of an application can be enrolled, either by the user or pre-enrolled prior to the user taking any action, and in doing so, a context (the generic physical object and the optional one or more criteria) for displaying the user interface element is established. These enrollments will be described in greater detail below.

In some examples, a specific context for displaying a user interface element of an application can be established by the user by enrolling an association between the specific physical object, an optional specific criterion or a set of criteria, and the user interface element. For example, the user can utilize the electronic device 301 to manually enroll an association between a specific window 310 being presented in the display of the electronic device, optionally one or more criteria (e.g., the distance between the electronic device and the window), and a user interface element of a weather application. Once the association is enrolled, a specific context consisting of the specific window 310 and the one or more criteria including the distance criterion is established for displaying the user interface element. This particular specific context and its association with a weather application is premised on the idea of improving the user experience by assuming that the user will be interested in knowing the current weather (and therefore will be interested in viewing a weather application) whenever the specific window 310 is viewed (which implies that the user is looking at that specific window while wearing the electronic device) and the user is sufficiently close to the window 310 (e.g., the window is detected and a criterion of the one or more criteria is satisfied when the distance between the electronic device and the window is below a distance threshold; in other words, the specific context has been detected). Other optional criteria that could become part of a context can include, but are not limited to, orientation of the electronic device towards the physical object, detected gaze at the physical object, etc. Multiple associations between multiple physical objects, optional criteria, and multiple user interface elements of multiple applications can be manually enrolled by a user of the electronic device to establish multiple specific contexts.

In some examples, a generic context for displaying a user interface element of an application can be established by the user by enrolling an association between a generic physical object, an optional specific criterion or a set of criteria (e.g., such as the threshold distance criterion above or other criteria discussed herein), and the user interface element. In one instance, the user can utilize the electronic device 301 to manually enroll an association between a generic window and a user interface element of a weather application, with no other criteria. Once the association is enrolled, a generic context consisting only of a generic window is established for displaying the user interface element. This particular generic context and its association with a weather application is premised on the idea of improving the user experience by assuming that the user will be interested in knowing the current weather (and therefore will be interested in viewing a weather application) whenever a generic window is displayed (which implies that the user is looking at that specific window while wearing the electronic device), without any other criterion.

In another example, the user can utilize the electronic device 301 to manually enroll an association between a generic window, a criterion requiring the appearance of a physical object recognized as an outdoor object (e.g., a tree 360) in the window, and a user interface element of a weather application. Once the association is enrolled, a generic context consisting of a generic window and the outdoor object criteria is established for displaying the user interface element. This particular generic context and its association with a weather application is premised on the idea of improving the user experience by assuming that the user will be interested in knowing the current weather (and therefore will be interested in viewing a weather application) when a window to the outside environment 325 is presented, as evidenced by an outdoor object such as a tree being visible through the window. Note that this generic context would not be detected (and the weather application would not be displayed) if the user were looking through an interior window, but no outdoor object was visible through the window. Other optional criteria that could become part of a generic context can include, but are not limited to, orientation of the electronic device towards the physical object, detected gaze at the physical object, etc. Multiple associations between multiple physical objects, multiple set of criteria, and multiple user interface elements of multiple applications can be manually enrolled by a user of the electronic device to establish multiple generic contexts.

In some examples, the electronic device 301 can receive a setup for opting into pre-enrolled associations between one or more generic physical objects optional specific criterion or a set of criteria, and one or more user interface elements of an application. In some examples, the user can confirm this setup by opting in to accept the generic contexts for the pre-enrolled associations, which were created without user input. In other examples, the generic contexts for the pre-enrolled associations can be accepted automatically without the need for the user to opt in.

As shown in FIG. 3A, the windows 310 and 312 can be within the field of view of the one or more cameras, and the representations of the windows can also be displayed on the electronic device 301. As noted above, a context can include a physical object in a physical environment, such as window 310 or 312, and optionally one or more criteria, and detecting the context can trigger the display of one or more user interface elements of an application such as a weather application; however, alternative or additional physical objects can also be part of a context to avoid triggering the user interface elements of the application when unintended by the user. For example, the physical environment 375 may include a specific door (not shown in FIG. 3A) that is in the field of view of the one or more cameras. In some examples, the specific window 310, the door, and one or more criteria can be associated with the weather application. Once this association is enrolled, a specific context is established that includes the window 310, the door, and the one or more criteria. In this example, detecting the window 310, the door, and the satisfaction of the one or more criteria are needed to detect the context that will trigger the display of the weather application.

As described above, the electronic device 301 can detect a physical object (e.g., detect window 310 in the physical environment 375) and determine that an optional criterion or a set of criteria have been satisfied to detect the context. Detection of the context can automatically trigger the display of a user interface element of an application and thereby improve the user experience of nimbly displaying desired user interface elements with minimal user input (e.g., without making a gesture with the hands, navigating a user interface, pressing a button, etc.). Several non-limiting example criteria for determining whether a context is detected will now be discussed. In the example of FIG. 3A, detecting the context associated with window 310 may include evaluating a criterion that is satisfied when the user or electronic device 301 is at or below a threshold distance 342 from the window 310 (e.g., the distance between the window 310 and user or electronic device 301 is less than a threshold distance of 3 feet, 6 feet, 10 feet, etc.). However, the context can remain undetected or switched back to an undetected status (and therefore display of the user interface element would optionally cease) if the electronic device is too far away from the window 310 to satisfy the threshold distance criterion (e.g., not satisfied when the distance greater than the threshold distance 342). In FIG. 3A, the electronic device 301 has not triggered the display of a user interface element of the weather application because the criteria associated with detecting a context (e.g., the context of window 310), including being at or within a threshold distance from the enrolled window, have not been satisfied.

In some examples relating to FIG. 3A, detecting the context associated with window 310 may include evaluating a criterion that is satisfied when the user or electronic device orientation 344 is directed at the window 310 (e.g., user's torso or HMD viewport is oriented towards the window), and that is not satisfied when the user or electronic device orientation 344 is not directed at the window 310. The user or electronic device orientation 344 is directed at the window 310 when a ray cast from the HMD in the direction corresponding to the orientation of the user or electronic device. In some examples, the "directed towards" the window when the ray intersects the window 310, or a region including the window (e.g., a region with some buffer, such as 1 cm, 2 cm, 5 cm, 10 cm, etc.; or a sub-region within the window, such as excluding border areas of the window to avoid accidental activation of the whether application), and not "directed toward the window when the ray does not intersect the window 310 or the region including the window. In the example of FIG. 3A, window 310 is detected, but the context associated with window 310 remains undetected because the electronic device is not oriented towards the window 310 and is instead oriented towards window 312. In addition, because no association between window 312 and a user interface element of a weather application has been enrolled, detecting window 312 and detecting an orientation 344 towards window 312 may not result in detection of a context. In general, even though detecting a physical object appearing in the field of view of the one or more cameras in the electronic device 301 may be part of the criteria for detecting a context, the electronic device will not trigger the display of the associated user interface element of the weather application if the criteria for detecting the context have not been satisfied.

Detecting the context associated with window 310 may include evaluating a criterion that is satisfied when the user's gaze (e.g., detected using eye/gaze tracking sensors) is directed at the window 310 (or alternatively, specified regions including or within window 310), and that is not satisfied when the user's gaze (e.g., a direction of the user's gaze) is detected to be not directed at the window 310 (e.g., using ray casting). In one interpretation of the example of FIG. 3A, the context associated with window 310 can remain undetected (and thus the display of a user interface element of the weather application will not be triggered) if the user's gaze 340 is not directed at the window 310 and is instead directed at table 322. In this example, gazing at table 322 does not result in detection of the context associated with window 310 because neither the physical object (detection of the window) nor the criterion (detection of gaze directed at the window) has been satisfied. In addition, the table is not part of a different context whose association with the user interface element of the weather application has been enrolled. In some examples, the gaze criterion discussed above may further include evaluating a criterion that is satisfied when the user's gaze is directed at particular and/or predetermined region of the window 310 or (e.g., detecting gaze within 3 inches from a predetermined and specific point). Additionally or alternatively, in some examples, the gaze criterion may further include evaluating a criterion that is satisfied when the user's gaze is directed at a surrounding region of the window 310 (e.g., 15 degrees of visual angle where the visual angle refers to the measure of the angular size of an object or a scene as perceived by an observer's eyes).

In some examples, detecting a generic context associated with a window may include evaluating a criterion that is satisfied when an area, shape, or one or more dimensions of the presented window satisfies one or more threshold dimensions or qualities (e.g., the window 310 possesses an area, length, width, or outline that is greater than a predetermined value). In one interpretation of the example of FIG. 3A, the generic context associated with a window can remain undetected because the detected one or more dimensions or qualities of window 310 may not satisfy a threshold value as required by a criterion of the generic context. A This particular generic context and its association with a weather application is premised on the idea of improving the user experience by assuming that the user will be interested in knowing the current weather (and therefore will be interested in viewing a weather application) only when a window appearing in the display satisfies certain conditions that warrant providing weather information (e.g., the window shows the outside environment, the window is large enough (and or the user is close enough to the window that the window appears large enough in field of view of the cameras), the window is not too large, and/or the brightness of the window suggests that it is daytime, etc.).

In some examples, detecting a generic context associated with a window may include evaluating a criterion that is satisfied when a shape or type of window corresponds to a predetermined shape or type (e.g., the window 310 possesses a circular or square shape or that window 310 is a tinted type of window). In one interpretation of the example of FIG. 3A, the generic context associated with a window can remain undetected because the detected window 310 does not satisfy the shape or type criterion of the generic context. Accordingly, even though a window 310 may be detected in the environment, the display of a user interface element of the weather application associated with window 310 is not triggered because the criteria, including a window having a predetermined shape or type, is not satisfied.

In some examples, detecting a generic context associated with a window may include evaluating a criterion that is satisfied when the user or electronic device is located within a predetermined region of the indoor environment (e.g., the user or electronic device is located within a region of an indoor environment such as a given space or room in the indoor environment, or within a predetermined radius from one or more predetermined coordinates within the indoor environment). Although not evident in FIG. 3A, the generic context associated with a window can remain undetected because even though a window 310 may be detected in the indoor environment, the electronic device is not located within a bedroom region of the indoor environment as required by a criterion of the generic context.

Figure 3B:
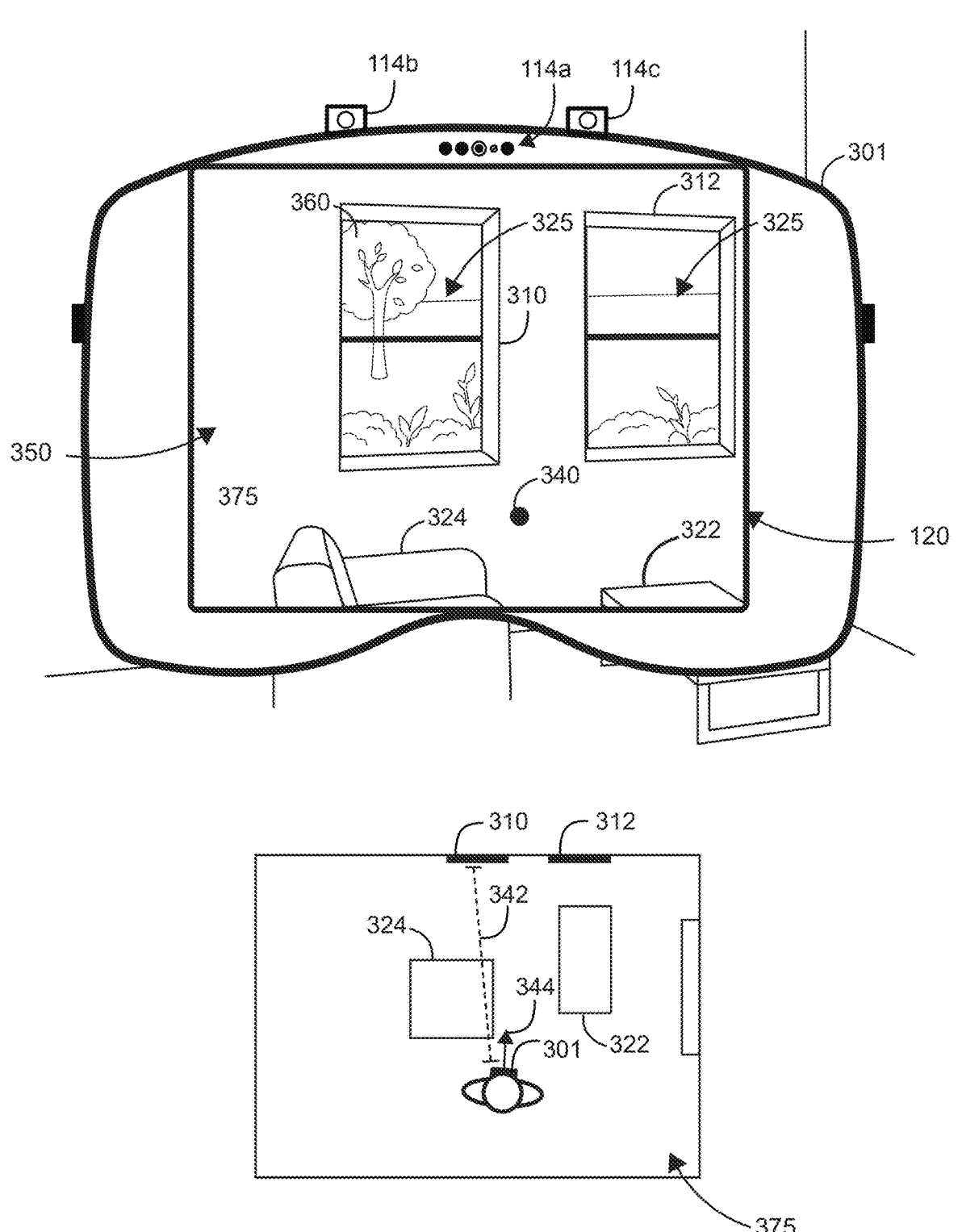

FIG. 3B illustrates an example of an electronic device that has moved in the physical environment (relative to the example of FIG. 3A) and has yet to detect a context and display one or more user interface elements of a weather application according to some examples of the disclosure. As shown in FIG. 3B, the electronic device 301 has moved from its previous location in FIG. 3A but remains positioned in the physical environment (e.g., an indoor environment) that includes a plurality of real-world objects. In the example of FIG. 3B, the electronic device 301 has changed its orientation 344 or viewport to be directed at window 310 instead of window 312, thereby changing the field of view of its display as provided by one or more of its cameras. Accordingly, in some examples, the electronic device 301 can present one or more updated representations of the physical objects based on the updated field of view provided by the one or more cameras or based on the updated field of view of the one or more translucent or transparent displays.

In some examples, as shown in FIG. 3B, the presented three-dimensional environment 350 includes updated portions of the indoor environment and an outside environment that are separated by a boundary (e.g., window 310 or window 312). In FIG. 3B, one or more physical objects (e.g., plant 326 in FIG. 3A) that were previously visible in the field of view of the one or more cameras are no longer visible in the updated field of view. In addition, one or more physical objects that were previously not visible in the field of view of the one or more cameras may become visible in an updated field of view. In some examples, the newly visible physical object(s) can be located in an outside environment directly or partially behind a transparent or translucent object (e.g., window 310 or window 312) and can be visible through the transparent or translucent object in the updated field of view of the one or more cameras. In this example, any of the physical objects in the updated field of view of the one or more cameras including the newly visible physical object(s) can be candidates for inclusion in a context in an enrolled or registered association with a user interface element of a weather application. In another example, the newly visible physical objects can form part of a context in a pre-enrolled association with a user interface element of a weather application.

In some examples, in FIG. 3B, detecting the context associated with window 310 may include evaluating a criterion that is satisfied when the duration of the user's gaze (e.g., detected using eye/gaze tracking sensors) directed at the window 310 (e.g., or a predetermined region of window 310) exceeds a threshold duration of time. In the example of FIG. 3B, the context associated with window 310 can remain undetected while the duration of user's gaze is less than a threshold duration of time. During this time, as shown in FIG. 3B, the electronic device 301 does not trigger the display of an associated user interface element of the weather application because the criteria for detecting the context associated with the window 310 has not yet been satisfied.

In some examples, detecting the context associated with window 310 may include evaluating a criterion that is satisfied when one or more weather parameters associated with an outside environment corresponding to the location of the electronic device satisfy associated threshold values. These weather parameters can be detected by sensors in the outside environment and communicated to the electronic device or detected by sensors on the electronic device. In some examples, the weather parameters may include an ultraviolet (UV) light index or solar radiation levels, air temperature, wind speed, humidity, precipitation level, or any atmospheric or meteorological parameters or indices associated with the outside environment. For example, detection of a context can include satisfaction of an air quality index criterion (a weather parameter) associated with an outside environment, wherein the criterion can be a threshold air quality index level for good air quality. In this example, the context associated with window 310 can remain undetected while the air quality index is below a threshold level (e.g., an air quality index), and the electronic device 301 does not trigger the display of a user interface element of the weather application because the criteria for detecting the context associated with window 310 has not yet been satisfied. As another example, detection of a context can include satisfaction of a precipitation criterion associated with an outside environment, wherein the criterion can be a threshold precipitation level. In this example, the context associated with window 310 can remain undetected while the precipitation level is below a threshold level (e.g., a precipitation level, optionally zero), and the electronic device 301 does not trigger the display of a user interface element of the weather application because the criteria for detecting the context associated with window 310 has not yet been satisfied (e.g., a therefore a user may not need to see precipitation information in a weather user interface).

In some examples, detecting the context associated with window 310 may include evaluating a criterion that is satisfied when one or more weather parameters fall below one or more associated thresholds. For example, detection of a context can include satisfaction of a freeze index for frost protection associated with an outside environment. In this, the context associated with window 310 can remain undetected while the freeze index for frost protection is above the threshold, and the electronic device 301 does not trigger the display of a user interface element of the weather application because the criteria for detecting the context associated with the window 310 has not yet been satisfied. It is understood that each of the one or more weather parameters can have an associated threshold is used to evaluate a criterion. Implementors will appreciate setting of the threshold, and whether the criterion is satisfied above or below threshold to present a weather user interface.

In some examples, detecting the context associated with window 310 may include evaluating a criterion that is satisfied when the time of day of detecting the window 310 corresponds to a predetermined time period (e.g., during early morning hours prior to start of business hours, such as before 8 am Monday through Friday). For example, displaying weather information from a weather application can be useful for a user preparing to commute to work on weekdays, or during the first daily usage of the electronic device. In this example, the context associated with window 310 can remain undetected when the time of day of detecting the window 310 does not correspond to the predetermined time period criteria, and the electronic device 301 does not trigger the display of a user interface element of the weather application because the criteria for detecting the context associated with the window 310 has not yet been satisfied.

In any of the examples described herein, including the examples shown in FIGS. 3A-3E, the criteria associated with detecting a context can be customized to user preferences, needs, and/or intentions. A user can likewise personalize the display of a user interface element of a weather application or the contents of the weather application according to user preferences, needs, and/or intentions. In some examples, the content of a user interface element of a weather application can be tailored to a unique set of criteria that were satisfied in order to detect the context associated with the user interface element. For example, if a criterion associated with a weather parameter for precipitation is above a threshold precipitation level (e.g., 0 mm) and results in the detection of a context, the contents of a user interface element of a weather application that is displayed after the context is detected can include a precipitation forecast chart and/or information relating to a period of time of above-threshold precipitation.

Figure 3C:
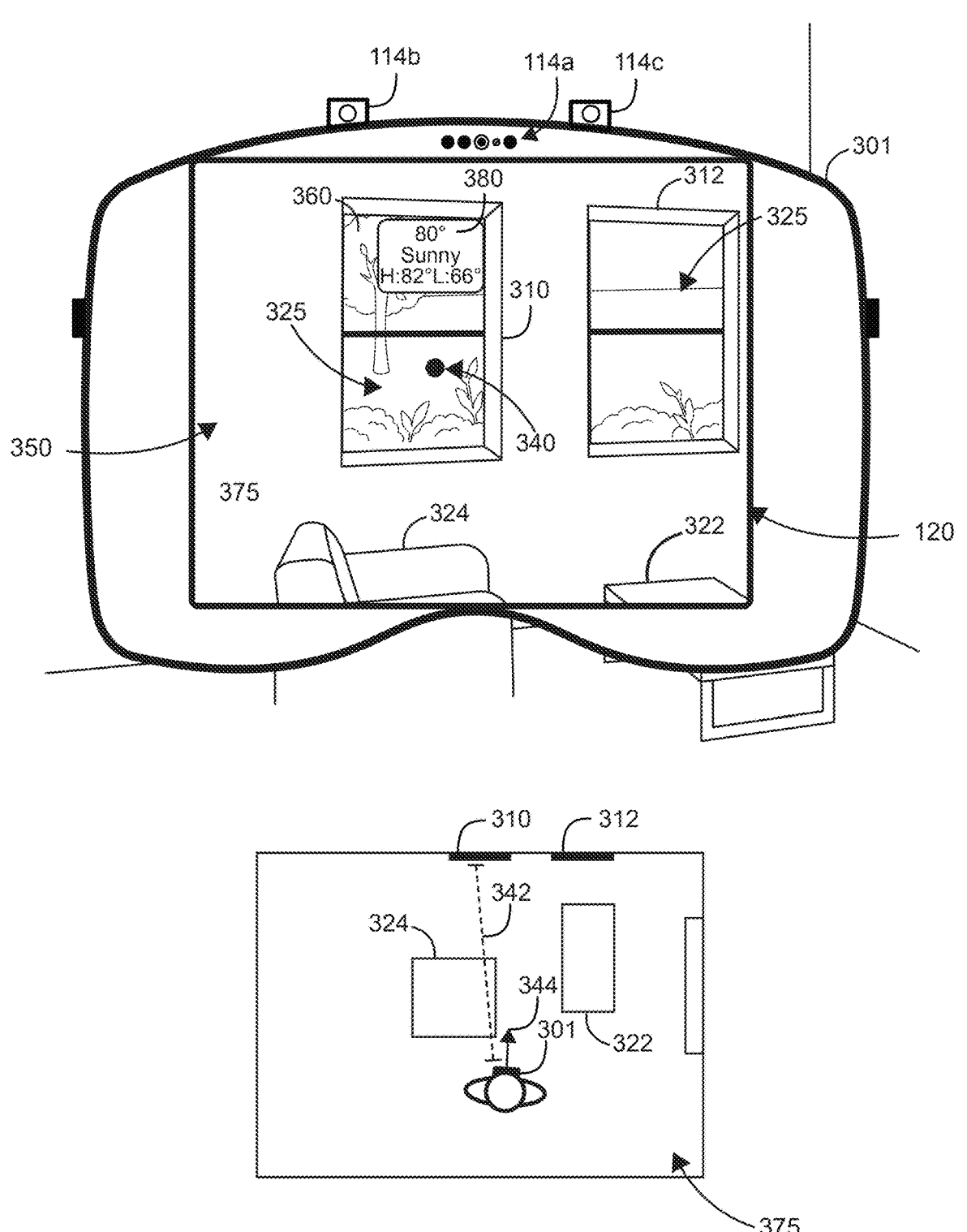

FIG. 3C illustrates an example of an electronic device that has moved in the physical environment (relative to the example of FIG. 3A) and has detected a context and is displaying a user interface element (e.g., user interface element 380) of an associated weather application according to some examples of the disclosure. As shown in FIG. 3C, although electronic device 301 has moved from its previous location in FIG. 3A, it remains positioned in the physical environment (e.g., an indoor environment) that includes a plurality of real-world objects. In in the example of FIG. 3C, the presented three-dimensional environment 350 includes updated portions of the indoor environment and the outside environment that are separated by a boundary (e.g., window 310 or window 312).

In the example of FIG. 3C, a user interface element 380 of a weather application can be displayed when the context associated with the user interface element is detected. In this example, the context can include detection of a specific window 310, detection of the user's gaze 340 at the window, detection of the orientation 344 of the electronic device towards the window, and the satisfaction of an outside temperature criterion (e.g., above zero degrees Fahrenheit). Here, all criteria have been satisfied, and accordingly, the user interface element 380 of the weather application is displayed. In the example of FIG. 3C, the content of the displayed user interface element includes a current temperature associated with the outside environment 325, a short description of expected weather conditions (e.g., "Sunny"), and an expected high and low daily temperature. In this example, the content of the user interface element 380 of the weather application is tailored to at least one of the satisfied criteria (e.g., the outside temperature criterion).

In some examples, the detection of a physical object (e.g., a window 310) can form a part of more than one context. For example, an association between a first context and a first user interface element (e.g., of a weather application) can be enrolled, and an association between a second context and a second user interface element (e.g., of the same weather application) can also be enrolled. Both the first and second contexts include detection of the same physical object. However, detecting the first context includes satisfying a first set of one or more criteria while detecting the second context includes satisfying a different, second set of one or more criteria. In this particular example, the first set of one or more criteria associated with window 310 can be satisfied while the different second set of one or more criteria (also associated with window 310) remain unsatisfied. As a result, the electronic device 301 can trigger the display of the first user interface element of the weather application that has been customized in accordance with the first set of criteria. For example, the first set of one or more criteria can be satisfied when the electronic device 301 is within a first threshold distance from window 310 while the second set of one or more criteria can be satisfied when the electronic device 301 is within a second threshold distance (greater than the first threshold distance) from the window. In the example of FIG. 3C, the first set of one or more criteria can remain unsatisfied while the second set of one or more criteria can be satisfied. Accordingly, the electronic device can display the user interface element 380 of the weather application in the form of the second user interface element (e.g., with larger font since only the second distance threshold has been satisfied) instead of in the form of the first user interface element (e.g., with smaller font).

As described above, when the electronic device determines the detection of a context including a physical object, a user interface element associated with the detected context can be displayed. Various techniques can be employed to ensure that the physical object remains visible while the user interface element is displayed. In some examples, the user interface element can be displayed adjacent to the physical object to allow visibility of the physical object. In other examples, the user interface element can be superimposed on the physical object so that some visibility remains for both the user interface element and the physical object. In some examples, one or more dimensions of the user interface element can be constrained to be smaller than one or more dimensions of the physical object while the user interface element is superimposed on the physical object, in order to allow visibility of the physical object and the surrounding environment. For example, as shown in FIG. 3C, the user interface element 380 has been superimposed on the window 310 with dimensions that do not occupy all of window 310 to allow visibility of the window 310 and the surrounding environment. In some examples, if the user is oriented towards a physical object with a small angle range (e.g., 10-20 degrees) from the direct or normal (e.g., with a perpendicular viewport from the window 310), a user interface element of an application can be displayed at the same small angle range to the physical object in order to appear directly aligned with the viewport. In some examples, the user can provide inputs to slide a user interface element across the user's viewport. For example, as shown in FIG. 3C, even though the user is oriented towards window 310 at a small angle, the user interface element 380 is displayed aligned with the user's viewport.

Figure 3D:
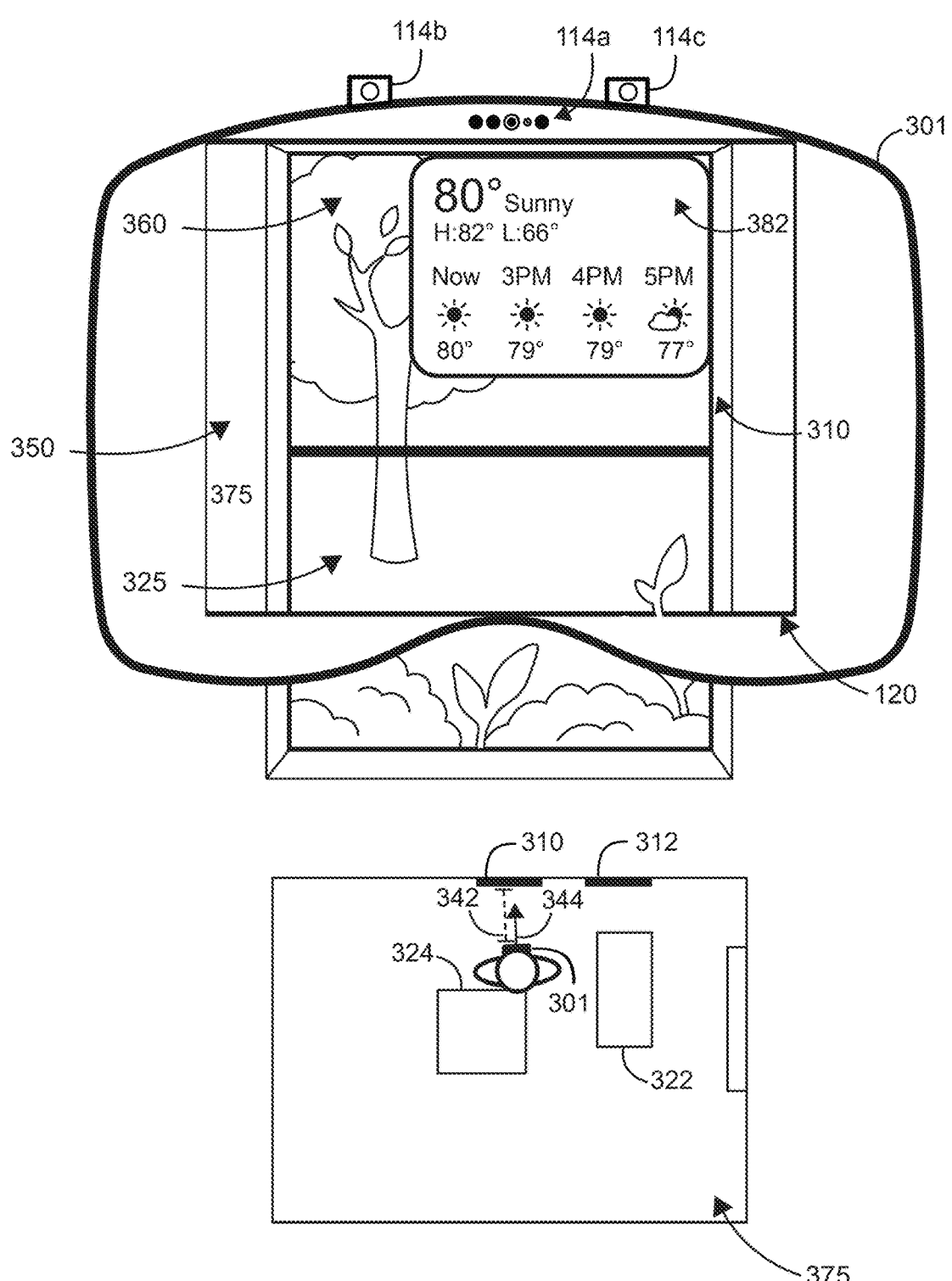

FIG. 3D illustrates an example of an electronic device that has moved in the physical environment (relative to the example of FIG. 3C) and has detected a different context as compared to FIG. 3C (e.g., a second context different from the context associated with displaying user interface element 380 in FIG. 3C) and is displaying a user interface element (e.g., user interface element 382) of an associated weather application according to some examples of the disclosure. As shown in FIG. 3D, the electronic device 301 has moved from its previous location in FIG. 3C but remains positioned in the physical environment (e.g., an indoor environment) that includes a plurality of real-world objects. In in the example of FIG. 3D, the presented three-dimensional environment 350 includes updated portions of the indoor environment and the outside environment that are separated by a boundary (e.g., window 310 or window 312).

In some examples, for ease of explanation, the first set of one or more criteria for the first context can be abstracted as criteria A and B. The second set of one or more criteria for the second context can be abstracted as criteria A, B and C. If a choice must be made to display either the user interface element associated with the first context or the second context, but not both, it should be evident that the satisfaction of criteria A and B, without knowing more, is insufficient to determine which context has been detected, and therefore which user interface element to display, because both criteria can potentially be satisfied. Accordingly, upon detection of the physical object (e.g., the window 310), the electronic device can determine via the registered enrollments that first and second contexts are associated with the detected physical object, and can identify the criteria for all the associated contexts (in this example, criteria A, B and C). All identified criteria can be evaluated, and depending on which criteria have been satisfied, the appropriate context can be detected, and the appropriate user interface element can be displayed. For example, if no criteria, or only one criterion is satisfied, or only criteria B and C are satisfied, or only criteria A and C are satisfied, no context is detected and no user interface element is displayed. If only criterion A and B but not C are satisfied, then the first context is detected and only the first user interface element can be displayed. However, if criteria A, B and C are satisfied, then both the first and second contexts are detected. In some examples, the electronic device may not display the first user interface element. Instead, the electronic device can be biased to display the second user interface because the set of criteria for detecting the second context (criteria A, B and C) is a larger set than the set of criteria for detecting the first context (criteria A and B). Having such a bias contributes to maximizing the conditions for detecting contexts so that the displayed user interface element can follow the intention of the user more closely. In a different interpretation, satisfying more criteria provides more confirmation that the user intends to view the user interface element associated with the higher criteria count context. In some examples, the bias of the electronic device may be predetermined according to user input. For example, the user can provide an input for the electronic device to be biased to triggering the display of the first user interface element if both the first and second set of criteria are satisfied. In another example, instead of the electronic device having a bias, both of the first and second user interface elements may display after satisfying criteria A, B, and C.

Following the example described in the previous paragraph, when the second context is detected, the electronic device may display the second user interface element with larger dimensions relative to the presented three-dimensional environment 350 (e.g., user interface element 382 occupies more than a fifth of the area of the three-dimensional environment 350 in FIG. 3D). Alternatively, in some examples, instead of the second user interface element having larger dimensions relative to the three-dimensional environment 350, the second user interface element can be emphasized or displayed with a higher brightness level (e.g., more than 50 percent localized brightness). In another scenario, when the first context is detected without detecting the second context, the electronic device may display the first user interface element with smaller dimensions relative to the three-dimensional environment 350 (e.g., user interface element 380 occupies less than a fifth of the area of the three-dimensional environment 350 in FIG. 3C). Alternatively, in some examples, instead of the second user interface element having smaller dimensions relative to the three-dimensional environment 350, the second user interface element can be de-emphasized or displayed with a lower brightness level (e.g., less than 50 percent localized brightness). In examples similar to the example described in the previous paragraph, the second user interface element can appear larger and contain more information than the first user interface element, in part due to second set of criteria being larger than the first criteria.

In the example of FIG. 3D, the content of the displayed user interface element 382 includes predicted upcoming temperatures associated with the outside environment 325. In this example, a context including window 310 and four criteria is satisfied because the electronic device 310 has detected the window 310, the user's gaze is directed at window 310 (thus satisfying one criterion), the weather of the outside environment is above a threshold value (e.g., 72 degrees Fahrenheit) (thus, satisfying a second criterion), the electronic device is oriented towards window 310 (thus satisfying a third criterion), and the distance between the electronic device 301 and window 310 is at or below a threshold distance (e.g., 10 feet) (thus satisfying a fourth criterion). Accordingly, the display of user interface element 382 of the weather application has been triggered. Additionally, in this example, the content of the user interface element 382 of the weather application has been tailored to the satisfied criteria. In the present example, the context includes a criterion that the outside temperature must be above 72 degrees Fahrenheit. Because detection of the context requires that the outside temperature be at least warm, if not hot, the content of the user interface of the weather application can be tailored to include information about the current temperature at the time of detecting window 310, the expected high and low temperatures on the day that window 310 was detected, the temperature forecast for a period of time after the detection of window 310, and a prediction of the persistence of sunny/cloudy conditions for a period of time after the detection of window 310. In other examples, additionally or alternatively to a context that requires satisfaction of temperature criterion of 72 degrees Fahrenheit, in some examples the context can additionally or alternatively require satisfaction of a threshold ultraviolet light index level in order to display user interface element 382.

In some examples, the electronic device 301 can trigger the user interface element of the weather application in a second visual state that has been customized in accordance with the different criteria and the different context that have been detected. For example, as shown in FIG. 3D, the criterion associated with reaching at or below a threshold distance from window 310, that was previously unsatisfied in the FIG. 3C example, is newly satisfied in addition to the satisfying other set of criteria. In this example, the electronic device can display the user interface element 382 of the weather application, which is a representation of the weather application in the second visual state (e.g., with a smaller font since the distance threshold included within detecting the different context has been satisfied).

As previously mentioned, in some examples, more than one context can be associated with the same physical object (e.g., a first context and a second context). In the previous example, detecting a first context included satisfying a first set of one or more criteria and displaying a first user interface element, and detecting a second, different context included satisfying a second, different set of one or more criteria and displaying a second user interface element. In the previous example, the first and second criterion were related but distinct (different threshold distances between the user and the window), and satisfaction of either of those criterion led to triggering first or second user interface elements that were related but distinct (different font sizes). However, in other examples, the first and second sets of one or more criteria can be related as subset and superset, respectively, as will be explained below.

Figure 3E:
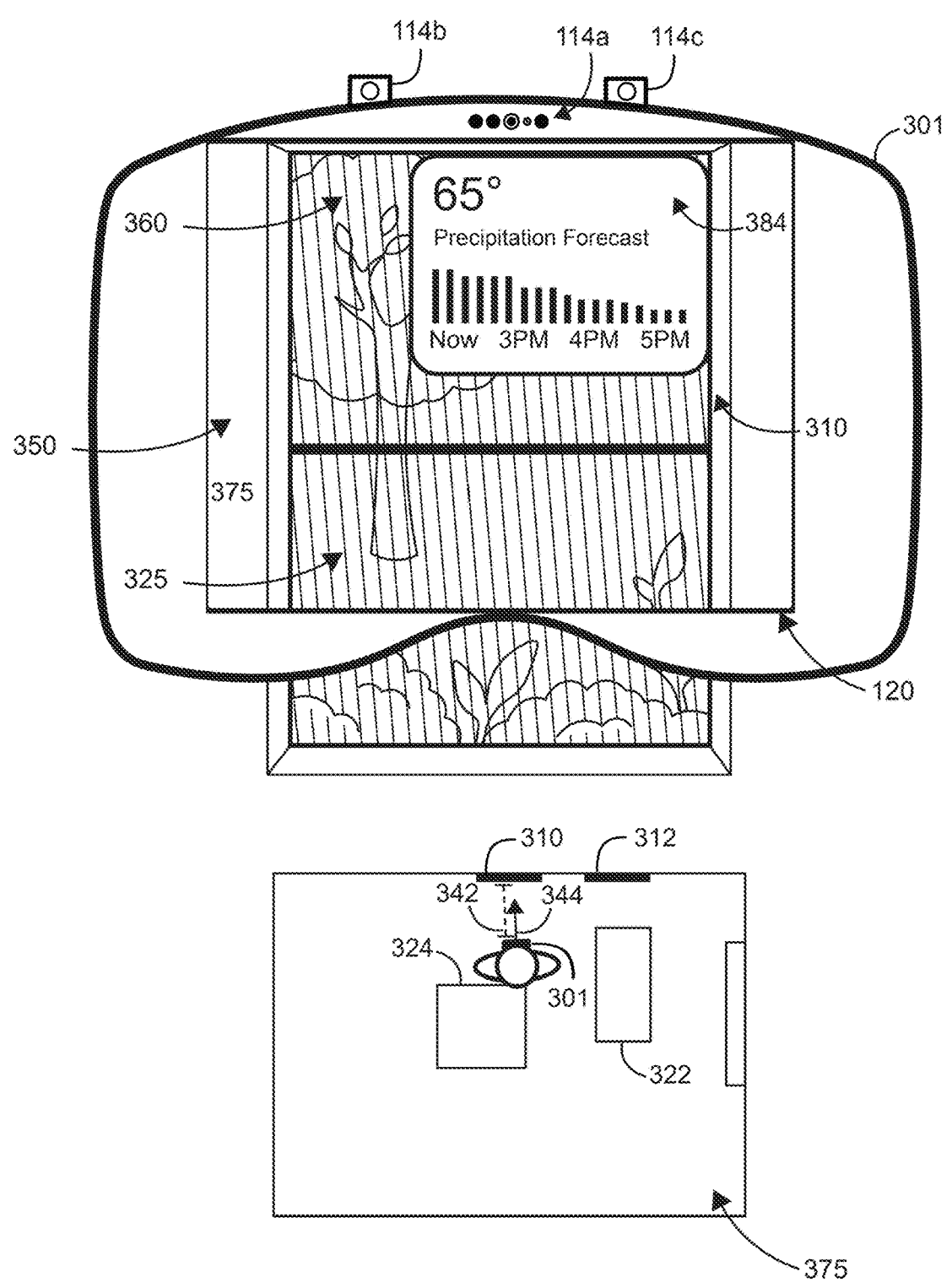

FIG. 3E illustrates an example of an electronic device that differs from the example depicted in FIG. 3D by displaying a different user interface element (e.g., user interface element 384) of an associated weather application in response to satisfying an additional criterion according to some examples of the disclosure. In the example of FIG. 3D, the content of the displayed user interface element 384 include a precipitation forecast for a period of time starting from the day and time that window 310 was detected, and a current temperature associated with the outside environment 325. In this example, a context associated with window 310 is detected because the electronic device 310 has detected the window 310, the user's gaze has been detected as being directed at window 310 (e.g., thus satisfying one criterion), the weather of the outside environment has been determined to be above a threshold (thus, satisfying a second criterion) value (e.g., 0 degrees Fahrenheit), the electronic device has been detected as being oriented towards window 310 (e.g., thus satisfying a third criterion), the precipitation in the outside environment has been determined to be above a threshold (thus, satisfying a fourth criterion) value (e.g., 0 mm), and the distance between the electronic device 301 and window 310 has been determined to be at or below a threshold (e.g., thus satisfying a fifth criterion) distance (e.g., 10 feet). Additionally, in this example, the content of the user interface element 384 of the weather application has been tailored to a key criterion within the satisfied criteria (e.g., reaching the threshold level for precipitation in the outside environment 325). In particular, the user interface element associated with the context has been tailored to provide weather information related to the precipitation (e.g., a precipitation forecast). In the example of FIG. 3E, because the precipitation criterion has been satisfied, the tailored user interface element of the weather application is displayed that includes a precipitation forecast as well as a current temperature.

In some examples, the electronic device 301 can cease a display of user interface element of an application associated with a corresponding context if the context is no longer detected. This can include examples involving user movement that result in contexts no longer being detected after previously being detected based on detecting a physical object and satisfying one or more criteria. In some examples, for any of the aforementioned criteria associated with a context, there can be the equivalent secondary criteria that evaluates the satisfaction of the reverse of the aforementioned criteria. For example, if a criterion is satisfied when the distance between the electronic device 301 reaches at or below a threshold distance 342, a corresponding secondary criterion is satisfied when the distance between the electronic device 301 reaches above a threshold distance. In some examples, while detecting a context includes detecting the physical object and satisfying one or more criteria associated with the context, and detecting the context triggers a display of a user interface element of an application, ceasing the detection of the physical object, or the one or more criteria no longer being satisfied (e.g., the reverse of the one or more criteria or the secondary criteria are satisfied) can trigger a ceasing of the display of the user interface element of the application. For example, the user can look away from a physical object for more than a threshold duration of time (e.g., the physical object is no longer detectable in the field of view of one or more cameras) that causes ceasing of a display of a user interface element associated with a context.

In some examples, user inputs can be gaze-based inputs. For example, the user can provide touch-based inputs as well as gaze-based inputs that detects user's gaze being directed at a user interface element displayed on the electronic device 301. In some examples, the user can provide inputs to dismiss a user interface element of an application including a user interface element of an application associated with a context (e.g., the user wishes to exit a user interface element that is displayed on the electronic device 301). In some examples, in response to user elections and/or inputs for dismissing a user interface element of an application, the electronic device ceases to display the user interface element of the application. In some examples, the user can provide inputs directed at and selecting a user interface element of an application associated with a context. In some examples, in response to user inputs selecting a user interface element of an application associated with a context, the electronic device can further expand the display of the user interface element of the application or launch the application and further display a representation of the application.

In some examples, the user, the electronic device, and/or the one or more physical object in the indoor or outdoor physical environment can make movement. In some examples, the electronic device detects the movements of itself, one or more physical objects in the indoor or outdoor physical environment, and/or the user, and in the process of such movements, the field of view of the one or more cameras including the representation of the one or more physical objects in the field of view of the one or more cameras can change, and previously non-visible one or more physical objects can optionally become visible in the changed field of view. In some examples, given that a changed field of view does not affect the detection of a context after a user interface element of an application associated with the context has been displayed, the display of the user interface element of the application can be adjusted in size (e.g., shrinking or enlarging as a function of distance), angle (e.g., orientation of the user interface tilting in response to slight shifts in the angle or the orientation of the electronic device). In general, in some examples, the display of a user interface element of an application associated with a context can transition from a first visual state to a second visual state. Additionally, in some examples, such changes to the visual states of a user interface element of an application can be due to a satisfaction of a different set of criteria that can optionally trigger the transition of the display of one user interface element of one application to another.

Figure 4A:
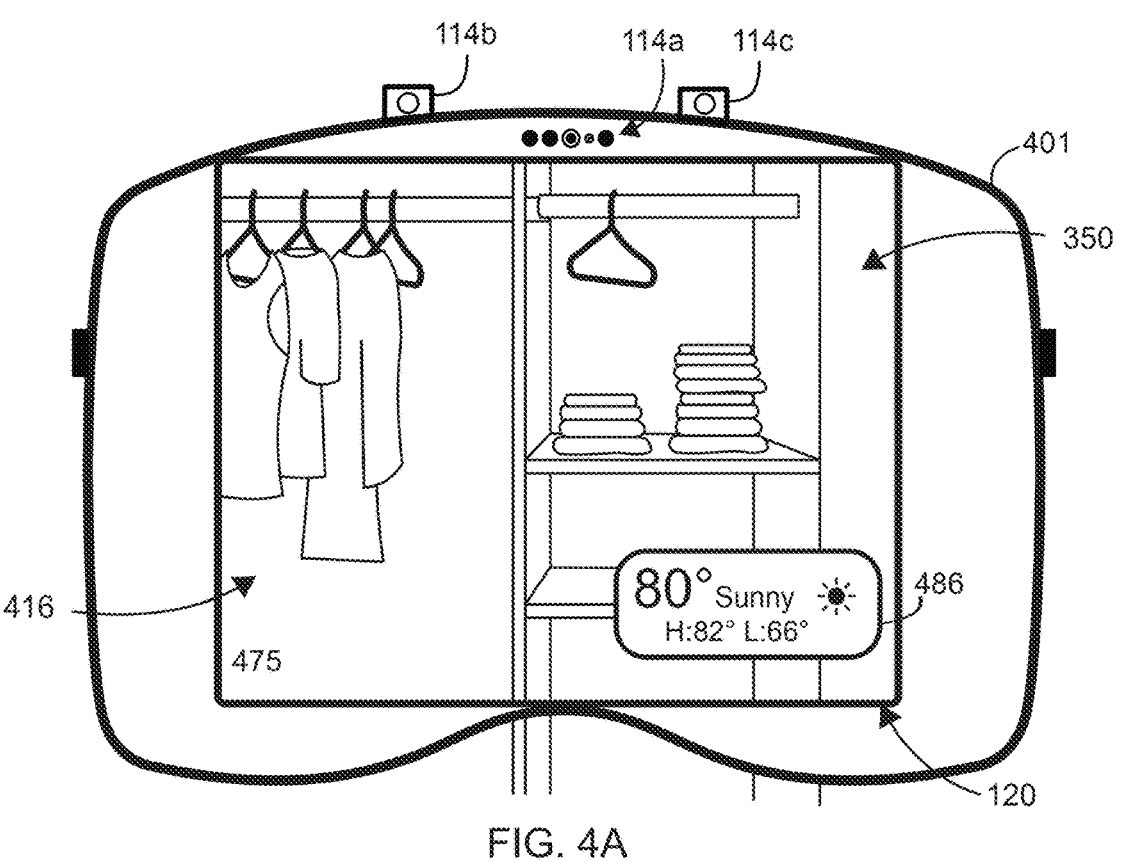
FIG. 4A illustrates an example of an electronic device that has moved in the physical environment (relative to the example of FIG. 3E), has detected a different context as compared to FIG. 3E, and is displaying a user interface element of an associated weather application according to some examples of the disclosure.

FIG. 4A illustrates an example of an electronic device that has moved in the physical environment (relative to the example of FIG. 3E) and has detected a different context as compared to FIG. 3E (e.g., a context different from the context associated with displaying user interface element 384 in FIG. 3E) and is displaying a user interface element (e.g., user interface element 486) of an associated weather application according to some examples of the disclosure. In the example of FIG. 4A, the presented three-dimensional environment 350 includes updated portions of the indoor environment while no portions of the outside environment are visible in the field of view of the one or more cameras of the electronic device. In this example, an association between the closet 314, optionally one or more criteria, and a user interface element of a weather application can be enrolled. As such, detecting the context can include detecting the closet 314 in the field of view of the one or more cameras and optionally satisfying the one or more criteria, such as a distance criteria as discussed herein.

In the example of FIG. 4A, the content of the displayed user interface element 486 is similar to the content of the user interface element 380 in FIG. 3C. In addition, the context and the optional one or more criteria are similar to the example of FIG. 3A, except that the context requires detection of closet 314 instead of window 310 or 312, and the optional one or more criteria can be in relationship with closet 314 instead of windows 310 or 312 (e.g., if satisfying a distance from a physical object is included within one or more criteria, in the example of FIG. 4A, such a distance is from closet 314 instead of window 310).

Figure 4B:
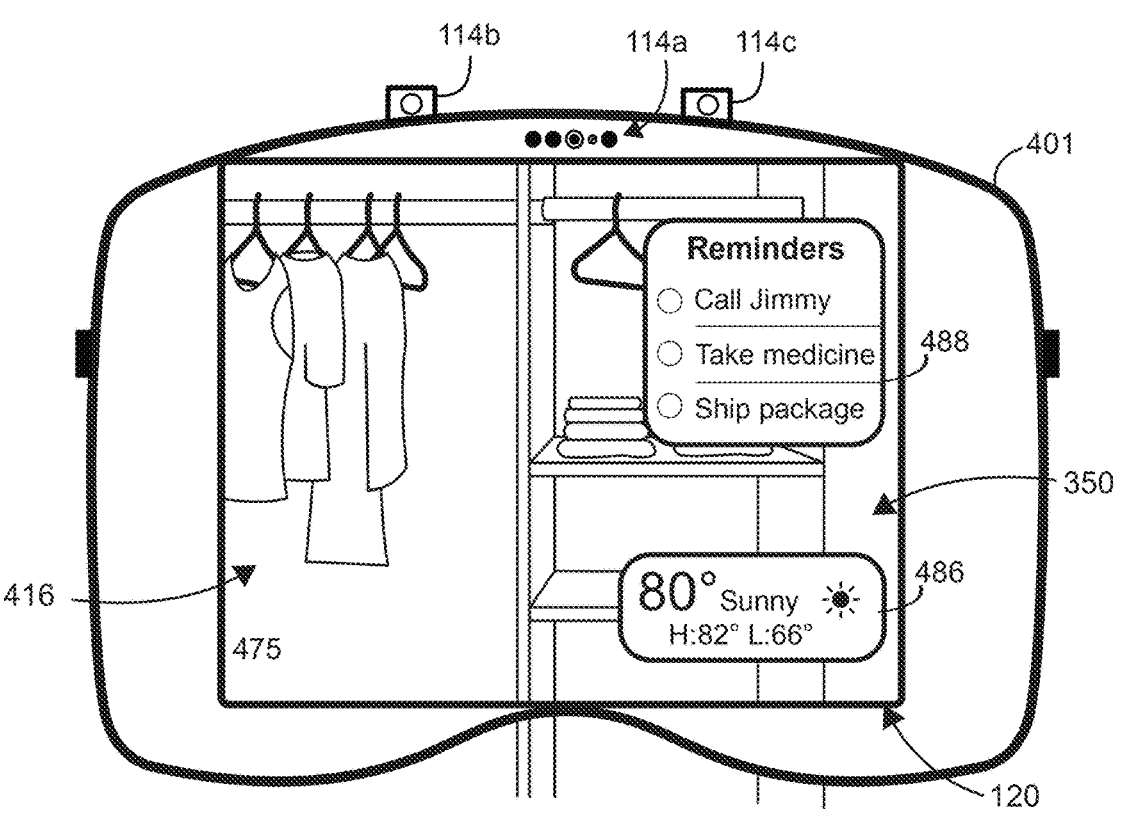
FIG. 4B illustrates an example of an electronic device that differs from the example depicted in FIG. 4A by displaying an additional and different user interface element of an additionally associated reminder application in response to detecting an additional context (as compared to FIG. 4A) according to some examples of the disclosure.

FIG. 4B illustrates an example of an electronic device that differs from the example depicted in FIG. 4A by displaying an additional and different user interface element (e.g., user interface element 488) of an additionally associated reminder application in response to detecting an additional context (as compared to FIG. 4A) according to some examples of the disclosure. In the example of FIG. 4B, an association between a physical object (e.g., closet 314), optionally a first set of criteria, and a user interface element of a weather application can be enrolled, and an association between a physical object (e.g., closet 314), a second set of criteria, and a user interface element of a reminder application can additionally be enrolled. As such, two contexts are enrolled. Detecting a context for displaying the user interface of the weather application can include detecting a physical object (e.g., closet 314) in the field of view of the one or more cameras and optionally satisfying a first set of criteria. Detecting a context for displaying the user interface of the reminder application can include detecting a physical object (e.g., closet 314) in the field of view of the one or more cameras and satisfying a second set of criteria (e.g., the satisfaction of a criterion in which the time of day is early enough where the user would presumably have enough time left in the day to address the actions due in the reminders list). Alternatively, instead of evaluating two different contexts, an association between a single context (e.g., including a third set of criteria), and two or more user interface elements (e.g., user interface element 486 and user interface element 488) can be enrolled. If the single context is detected (e.g., the third set of criteria are satisfied), all of the associated user interface elements can be displayed.

Figure 5A:
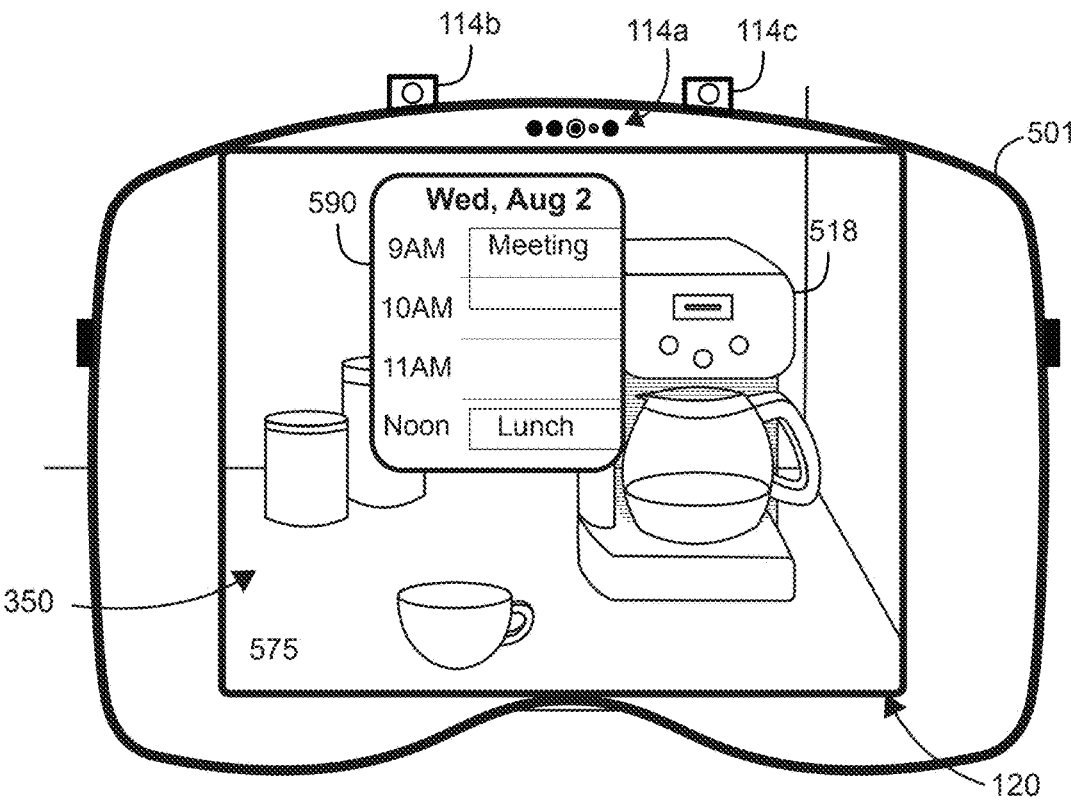
FIGS. 5A-5B illustrate examples of an electronic device that differ from the examples depicted in FIGS. 3C-4B by displaying a different user interface element of an associated calendar application in response to detecting a different physical object within a different physical environment and detecting two different contexts having different sets of criteria according to some examples of the disclosure.
Figure 5B:
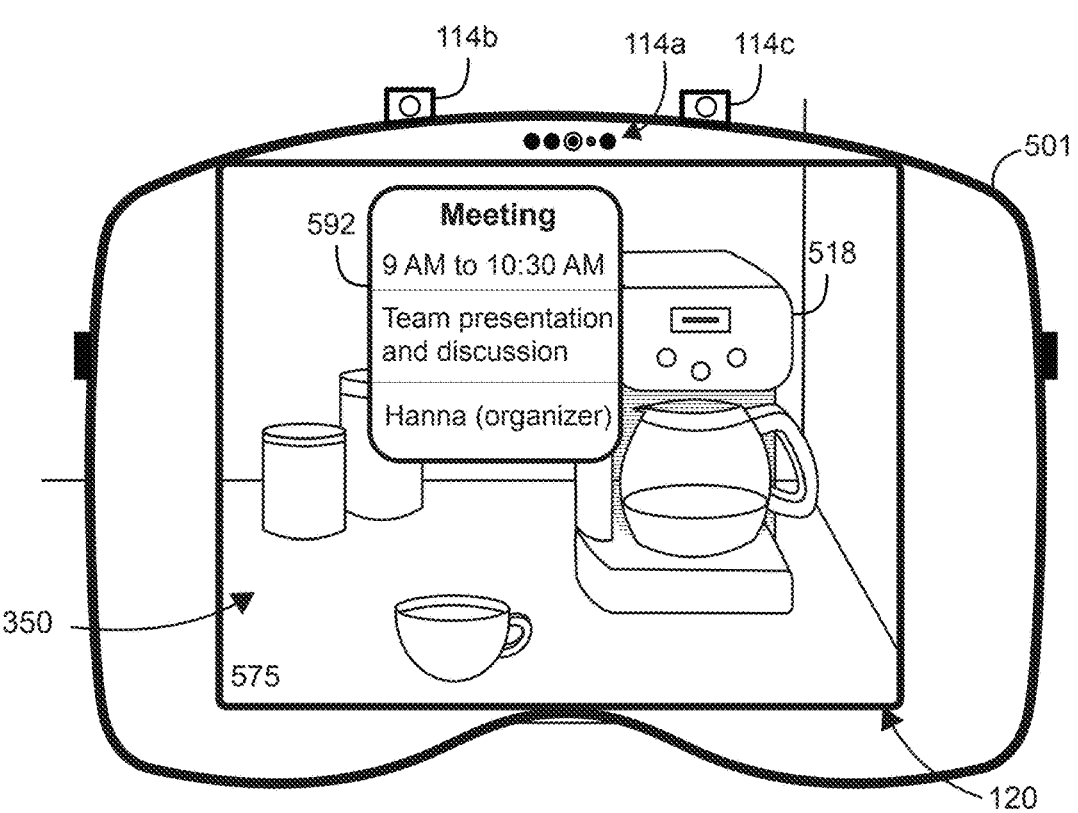

FIGS. 5A-5B illustrate examples of an electronic device that differ from the examples depicted in FIGS. 3C-4B by displaying a different user interface element (e.g., user interface elements 590 and 592) of an associated calendar application in response to detecting a different physical object (e.g., coffee maker 316) within a different physical environment (indoor environment 575) and detecting two different contexts having different sets of criteria according to some examples of the disclosure. All prior example features and alternatives discussed with respect to preceding figures may apply to the examples depicted in FIGS. 5A-B.

It is understood that the examples shown and described herein are merely exemplary and that additional and/or alternative elements may be provided within the three-dimensional environment.

FIG. 6 is a flow diagram illustrating an example process for displaying content such as one or more user interface elements of an application executing on the electronic device based on detecting one or more pre-enrolled contexts according to some examples of the disclosure. In some examples, process 600 begins at an electronic device in communication with one or more displays, one or more input devices, and one or more cameras. In some examples, the electronic device is optionally a head-mounted display similar or corresponding to electronic device 201 of FIG. 2. As shown in FIG. 6, in some examples, at 602, the electronic device detects one or more physical objects in a physical environment being displayed and/or presented on the one or more displays. For example, as illustrated in FIG. 3A, the electronic device 301 detects window 310 in physical environment 375 that is visible in three-dimensional environment 350 presented at the electronic device 301.

In some examples, at 604, the electronic device detects an enrolled association between a first context and a first user interface of an application, and the first context includes detection of a first physical object. For example, as described with reference to FIG. 3C, the electronic device 301 detects the enrolled association between window 310 and user interface element 380 of the weather application, and the first context includes detecting window 310. In some examples, instead of the electronic device starting the process 600 at 602, the electronic device can start the process 600 at 604 and transition to 602.

In some examples, at 606, in accordance with the detection of the one or more physical objects and the detection of the enrolled associations between the first context and the first user interface, the electronic device determines that the first context is detected using the one or more input devices including the one or more cameras. For examples, as described with reference to FIG. 3D, a first context includes detecting window 310 (e.g., and optionally one or more criteria), and the electronic device further detects window 310 and detects the enrolled association between the first context and the user interface element 382 of the weather application. Accordingly, in the process of these detections, the electronic determines that the first context is detected via the one or more inputs devices that includes the one or more cameras.

In some examples, at 608, in accordance with the determination that the first context is detected, the electronic device displays, using the one or more displays, the first user interface of the application. For example, as described with reference to FIG. 3D, the electronic device 301 completes its determination for the first context being detected (e.g., detecting window 310 and optionally one or more criteria). Window 310 is detected (e.g., and the optional one or more criteria relating distance, orientation, gaze, etc. are also satisfied). Accordingly, as shown in FIG. 3D, the electronic device 301 displays user interface element 382 that includes predicted upcoming temperatures associated with the outside environment 325.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

FIG. 7 is a flow diagram illustrating an example process for displaying content such as one or more user interface elements of an application executing on the electronic device based on detection of one or more user-generated contexts according to some examples of the disclosure. In some examples, process 700 begins at an electronic device in communication with one or more displays, one or more input devices, and one or more cameras. In some examples, the electronic device is optionally a head-mounted display similar or corresponding to electronic device 201 of FIG. 2. As shown in FIG. 7, in some examples, at 702, the electronic device recognizes a first physical objects in a physical environment being displayed and/or presented one the one or more displays. For example, as illustrated in FIG. 3A, the electronic device 301 recognizes window 310 in physical environment 375 that is visible in three-dimensional environment 350 presented at the electronic device 301.

In some examples, at 704, the electronic device enrolls an association between a first context, a first user interface of an application, and one or more criteria, and the first context includes detection of a first physical object and satisfying one or more criteria. For example, as described with reference to FIG. 3C, the electronic device 301 enrolls an association between window 310, a set of criteria including threshold distance, orientation, gaze, and user interface element 380 of the weather application, and the first context includes detecting window 310, satisfying threshold distance 342, satisfying orientation directed at window 310, satisfying user's gaze 340 directed at window 310. In some examples, instead of the electronic device starting the process 700 at 702, the electronic device can start the process 700 at 704 and transition to 702.

In some examples, at 706, the electronic device determines that the first context is detected using the one or more input devices including the one or more cameras. For examples, as described with reference to FIG. 3E, a first context includes detecting window 310 and one or more criteria, and the electronic device further detects window 310 and enrolls an association between the first context, one or more criteria, and the user interface element 384 of the weather application. Accordingly, in the process of these detections, the electronic determines that the first context is detected via the one or more inputs devices that includes the one or more cameras.

In some examples, at 708, in accordance with the determination that the first context is detected, the electronic device displays, using the one or more displays, the first user interface of the application. For example, as described with reference to FIG. 3E, the electronic device 301 completes its determination for the first context being detected (e.g., detecting window 310 and one or more criteria). Window 310 is detected, and the one or more criteria relating distance, orientation, gaze, etc. are also satisfied. Accordingly, as shown in FIG. 3D, the electronic device 301 displays user interface element 384 that includes predicted upcoming temperatures associated with the outside environment 325.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising, at an electronic device in communication with one or more displays and one or more input devices including one or more cameras, detecting, using the one or more input devices including the one or more cameras, one or more physical objects in a physical environment, detecting an enrolled association between a first context and a first user interface of a weather application, the first context including detection of a window, in accordance with the detection of the enrolled association between the first context and the first user interface and a determination that the one or more physical objects include a detected window, determining that the first context is detected, and in accordance with determining that the first context is detected, displaying, using the one or more displays, the first user interface of the weather application. Additionally or alternatively to one or more of the examples described above, in some examples, the first context comprises one or more criteria, and determining that the first context is detected is in accordance with a determination that the one or more criteria are satisfied. Additionally or alternatively to one or more of the examples described above, in some examples, the one or more criteria include a criterion that is satisfied when one or more weather parameters associated with an outside environment corresponding to a location of the electronic device satisfy one or more thresholds. Additionally or alternatively to one or more of the examples described above, in some examples, the one or more criteria include a criterion that is satisfied when the detected one or more physical objects include one or more physical objects in an outside environment corresponding to a location of the electronic device that are visible through the detected window. Additionally or alternatively to one or more of the examples described above, in some examples, the one or more criteria include a criterion that is satisfied when a distance between the detected window and the electronic device is within a threshold distance. Additionally or alternatively to one or more of the examples described above, in some examples, the one or more criteria include a criterion that is satisfied when a direction of gaze is directed at the detected window or directed at a physical object that is visible through the detected window. Additionally or alternatively to one or more of the examples described above, in some examples, the one or more criteria include a criterion that is satisfied when a duration of gaze directed at the detected window is greater than a threshold duration. Additionally or alternatively to one or more of the examples described above, in some examples, the one or more criteria include a criterion that is satisfied when a shape of the detected window corresponds to a predetermined shape, or one or more dimensions of the detected window satisfies one or more threshold dimensions. Additionally or alternatively to one or more of the examples described above, in some examples, the one or more criteria include a criterion that is satisfied when an orientation or viewport of the electronic device is directed at the detected window. Additionally or alternatively to one or more of the examples described above, in some examples, the one or more criteria include a criterion that is satisfied when a location of the electronic device is within a predetermined region of the physical environment. Additionally or alternatively to one or more of the examples described above, in some examples, the one or more criteria include a criterion that is satisfied when a time of detecting the first context corresponds to a predetermined time period. Additionally or alternatively to one or more of the examples described above, in some examples, the one or more criteria include a criterion that is satisfied when the detected window is a predetermined window or type of window. Additionally or alternatively to one or more of the examples described above, in some examples, the first user interface of the weather application is customized in accordance with the one or more criteria of the first context. Additionally or alternatively to one or more of the examples described above, in some examples, the one or more criteria include a criterion that is satisfied when a detected ultraviolet light index level satisfies a threshold ultraviolet light index level, and customizing the first user interface of the weather application includes modifying the first user interface to display at least one ultraviolet light index level when the detected ultraviolet light index level satisfies the threshold ultraviolet light index level. Additionally or alternatively to one or more of the examples described above, in some examples the method further comprises, enrolling, at the electronic device, an association between the first context and the first user interface of the weather application. Additionally or alternatively to one or more of the examples described above, in some examples, detecting the enrolled association comprises selecting a pre-enrolled association. Additionally or alternatively to one or more of the examples described above, in some examples the method further comprises, in accordance with a determination that the first context is no longer detected, ceasing the display of the first user interface of the weather application. Additionally or alternatively to one or more of the examples described above, in some examples the method further comprises, detecting movement of the electronic device, and in accordance with detecting movement of the electronic device, updating a location, an orientation, a size or a shape of the first user interface of the weather application. Additionally or alternatively to one or more of the examples described above, in some examples the method further comprises, detecting one or more inputs directed to the first user interface of the weather application, and in response to detecting the one or more inputs directed to the first user interface of the weather application, displaying a second user interface of the weather application, and ceasing displaying the first user interface of the weather application. Additionally or alternatively to one or more of the examples described above, in some examples the method further comprises, detecting an enrolled association between a second context and a second user interface of the weather application, the second user interface different from the first user interface, in accordance with the detection of the enrolled association between the second context and the second user interface, determining that the second context is detected, and in accordance with the determination that the second context is detected, concurrently displaying the first user interface of the weather application and the second user interface of the weather application. Additionally or alternatively to one or more of the examples described above, in some examples the method further comprises, detecting an enrolled association between a second context and a second user interface of a second application, the second user interface and the second application different from the first user interface and the weather application, in accordance with the detection of the enrolled association between the second context and the second user interface, determining that the second context is detected, and in accordance with the determination that the second context is detected, concurrently displaying, using the one or more displays, the first user interface of the weather application and the second user interface of the second application.

Therefore, according to the above, some examples of the disclosure are directed to a method, comprising, at an electronic device in communication with one or more displays and one or more input devices including one or more cameras, detecting, using the one or more input devices including the one or more cameras, one or more physical objects in a physical environment, detecting an enrolled association between a first context and a first user interface of a weather application, the first context including detection of a closet, and detecting an enrolled association between a second context and a second user interface of a reminder application, in accordance with the detection of the closet, the detection of the enrolled association between the first context and the first user interface, and the detection of the enrolled association between the second context and the second user interface, determining that the first and second contexts are detected, and in accordance with the determination that the first context has and the second context have been detected, concurrently displaying, using the one or more displays, the first user interface of the weather application and the second user interface of the reminder application. Additionally or alternatively to one or more of the examples described above, in some examples, the first context comprises one or more criteria, and the determination that the first context is detected is further in accordance with a determination that the one or more criteria are satisfied. Additionally or alternatively to one or more of the examples described above, in some examples, the second context comprises one or more criteria, and the determination that the first context is detected is further in accordance with a determination that the one or more criteria are satisfied. Additionally or alternatively to one or more of the examples described above, in some examples, the one or more criteria include a criterion that is satisfied when one or more weather parameters associated with an outside environment corresponding to a location of the electronic device satisfy a threshold. Additionally or alternatively to one or more of the examples described above, in some examples, the one or more criteria include a criterion that is satisfied when a distance between the detected closet and the electronic device satisfies a threshold distance. Additionally or alternatively to one or more of the examples described above, in some examples, the one or more criteria include a criterion that is satisfied when a direction of gaze is directed at the detected closet. Additionally or alternatively to one or more of the examples described above, in some examples, the one or more criteria include a criterion that is satisfied when a duration of gaze directed at the detected closet satisfies a threshold duration. Additionally or alternatively to one or more of the examples described above, in some examples, the one or more criteria include a criterion that is satisfied when a shape of the detected closet corresponds to a predetermined shape, or one or more dimensions of the detected closet satisfies one or more threshold dimensions. Additionally or alternatively to one or more of the examples described above, in some examples, the one or more criteria include a criterion that is satisfied when an orientation or viewport of the electronic device is directed at the detected closet. Additionally or alternatively to one or more of the examples described above, in some examples, the one or more criteria include a criterion that is satisfied when a location of the electronic device is within a predetermined region of the physical environment. Additionally or alternatively to one or more of the examples described above, in some examples, the one or more criteria include a criterion that is satisfied when a time of detecting the first or second context corresponds to a predetermined time period. Additionally or alternatively to one or more of the examples described above, in some examples, the one or more criteria include a criterion that is satisfied when the detected closet is a predetermined closet or type of closet. Additionally or alternatively to one or more of the examples described above, in some examples, the first user interface of the weather application is customized in accordance with the one or more criteria of the first context. Additionally or alternatively to one or more of the examples described above, in some examples, the one or more criteria include a criterion that is satisfied when a detected ultraviolet light index level satisfies a threshold ultraviolet light index level, and customizing the first user interface of the weather application includes modifying the first user interface to display at least one ultraviolet light index level when the detected ultraviolet light index level satisfies the threshold ultraviolet light index level. Additionally or alternatively to one or more of the examples described above, in some examples, the first user interface of the reminder application is customized in accordance with the one or more criteria of the second context. Additionally or alternatively to one or more of the examples described above, in some examples the method further comprises, enrolling, at the electronic device, an association between the first context and the first user interface of the weather application. Additionally or alternatively to one or more of the examples described above, in some examples the method further comprises, enrolling, at the electronic device, an association between the second context and the second user interface of the reminder application. Additionally or alternatively to one or more of the examples described above, in some examples, detecting the enrolled association comprises selecting a pre-enrolled association. Additionally or alternatively to one or more of the examples described above, in some examples the method further comprises, in accordance with a determination that the first context is no longer detected, ceasing the display of the first user interface of the weather application. Additionally or alternatively to one or more of the examples described above, in some examples the method further comprises, detecting movement of the electronic device, and in accordance with the detection of movement of the electronic device, updating a location, an orientation, a size or a shape of the first user interface of the weather application. Additionally or alternatively to one or more of the examples described above, in some examples the method further comprises, detecting movement of the electronic device, and in accordance with the detection of movement of the electronic device, updating a location, an orientation, a size or a shape of the second user interface of the reminder application.

Some examples of the disclosure are directed to a method, comprising, at an electronic device in communication with one or more displays and one or more input devices including one or more cameras, detecting, using the one or more input devices including the one or more cameras, one or more physical objects in a physical environment, detecting an enrolled association between one or more contexts and one or more user interfaces of one or more applications, the one or more contexts including detection of a first physical object, in accordance with the detection of the closet and the one or more enrolled associations between the one or more contexts and the one or more first user interfaces of the one or more applications, determining that the one or more contexts are detected, in accordance with the determination that the one or more contexts have been detected, concurrently displaying, using the one or more displays, the one or more user interfaces of the one or more applications. Additionally or alternatively to one or more of the examples described above, in some examples, the first physical object is a window. Additionally or alternatively to one or more of the examples described above, in some examples, the first physical object is a closet. Additionally or alternatively to one or more of the examples described above, in some examples, the one or more contexts comprises a first context including one or more criteria, and the method further comprises, detecting an enrolled association between the first context and a plurality of user interfaces of the one or more applications, in accordance with a determination that the first context has been detected, concurrently displaying, using the one or more displays, the plurality of user interfaces of the one or more applications. Additionally or alternatively to one or more of the examples described above, in some examples, one or more processors, memory, and one or more programs stored in the memory and configured to be executed by the one or more processors, the one or more programs including instructions for performing a method of one or more of the examples disclosed above. Additionally or alternatively to one or more of the examples described above, in some examples, a non-transitory computer readable storage medium storing one or more programs, the one or more programs comprising instructions, which when executed by one or more processors of an electronic device, cause the electronic device to perform a method of one or more of the examples disclosed above. Additionally or alternatively to one or more of the examples described above, in some examples, an electronic device, comprising, one or more processors, memory, and means for performing a method of one or more of the examples disclosed above. Additionally or alternatively to one or more of the examples described above, in some examples, an information processing apparatus for use in an electronic device, the information processing apparatus comprising, means for performing a method of one or more of the examples disclosed above.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:
   at an electronic device in communication with one or more displays and one or more input devices including one or more cameras:
   detecting, using the one or more input devices including the one or more cameras, one or more physical objects in a physical environment;
   detecting an enrolled association between a first context and a first user interface of a weather application, the first context including detection of a window;
   in accordance with the detection of the enrolled association between the first context and the first user interface of the weather application and in response to a determination that one or more criteria are satisfied, the one or more criteria including a criterion that is satisfied when the one or more physical objects include a detected window, determining that the first context is detected;
   in accordance with determining that the first context is detected, displaying, using the one or more displays, the first user interface of the weather application; and
   in accordance with determining that the first context is not detected, forgoing displaying the first user interface of the weather application.

2. The method of claim 1, wherein the one or more criteria include one or more of:
   a criterion that is satisfied when one or more weather parameters associated with an outside environment corresponding to a location of the electronic device satisfy one or more thresholds;

a criterion that is satisfied when the one or more physical objects include one or more physical objects in an outside environment corresponding to a location of the electronic device that are visible through the window;

a criterion that is satisfied when a distance between the window and the electronic device is within a threshold distance;

a criterion that is satisfied when a direction of gaze is directed at the window or directed at a physical object that is visible through the window;

a criterion that is satisfied when a duration of gaze directed at the window for greater than a threshold duration;

criterion that is satisfied when a shape of the window corresponds to a predetermined shape, or one or more dimensions of the window are greater than one or more threshold dimensions;

a criterion that is satisfied when an orientation or viewport of the electronic device is directed at the window;

a criterion that is satisfied when a location of the electronic device is within a predetermined region of the physical environment;

a criterion that is satisfied when a time of detecting the first context corresponds to a predetermined time period; or a criterion that is satisfied when the window is a predetermined window or type of window.

3. The method of claim 1, wherein the first user interface of the weather application is customized in accordance with the one or more criteria of the first context.

4. The method of claim 1, further comprising:

detecting movement of the electronic device; and in accordance with detecting the movement of the electronic device, updating a location, an orientation, a size or a shape of the first user interface of the weather application.

5. The method of claim 1, further comprising:

detecting one or more inputs directed to the first user interface of the weather application; and in response to detecting the one or more inputs directed to the first user interface of the weather application:

displaying a second user interface of the weather application; and ceasing displaying the first user interface of the weather application.

6. The method of claim 1, further comprising:

detecting an enrolled association between a second context and a second user interface of the weather application, the second user interface different from the first user interface;

in accordance with the detection of the enrolled association between the second context and the second user interface of the weather application, determining that the second context is detected; and in accordance with the determination that the second context is detected, concurrently displaying the first user interface of the weather application and the second user interface of the weather application.

7. The method of claim 1, further comprising:

detecting an enrolled association between a second context and a second user interface of a second application, the second user interface and the second application different from the first user interface and the weather application;

in accordance with the detection of the enrolled association between the second context and the second user interface, determining that the second context is detected; and in accordance with the determination that the second context is detected, concurrently displaying, using the one or more displays, the first user interface of the weather application and the second user interface of the second application.

8. The method of claim 1, further comprising:

in accordance with a determination that the first context is no longer detected, ceasing displaying the first user interface of the weather application.

9. An electronic device comprising:

one or more processors;

one or more input devices including one or more cameras;

memory; and one or more programs stored in the memory and configured to be executed by the one or more processors, the one or more programs including instructions for:

detecting, using the one or more input devices including the one or more cameras, one or more physical objects in a physical environment;

detecting an enrolled association between a first context and a first user interface of a weather application, the first context including detection of a window;

in accordance with the detection of the enrolled association between the first context and the first user interface of the weather application and in response to a determination that one or more criteria are satisfied, the one or more criteria including a criterion that is satisfied when the one or more physical objects include a detected window, determining that the first context is detected;

in accordance with the determination that the first context is detected, displaying, using the one or more displays, the first user interface of the weather application; and in accordance with determining that the first context is not detected, forgoing displaying, using the one or more displays, the first user interface of the weather application.

10. The electronic device of claim 9, wherein the one or more criteria include one or more of:

a criterion that is satisfied when one or more weather parameters associated with an outside environment corresponding to a location of the electronic device satisfy one or more thresholds;

a criterion that is satisfied when the one or more physical objects include one or more physical objects in an outside environment corresponding to a location of the electronic device that are visible through the window;

a criterion that is satisfied when a distance between the window and the electronic device is within a threshold distance;

a criterion that is satisfied when a direction of gaze is directed at the window or directed at a physical object that is visible through the window;

a criterion that is satisfied when a duration of gaze directed at the window for greater than a threshold duration;

criterion that is satisfied when a shape of the window corresponds to a predetermined shape, or one or more dimensions of the window are greater than one or more threshold dimensions;

a criterion that is satisfied when an orientation or viewport of the electronic device is directed at the window;

a criterion that is satisfied when a location of the electronic device is within a predetermined region of the physical environment;

a criterion that is satisfied when a time of detecting the first context corresponds to a predetermined time period; or a criterion that is satisfied when the window is a predetermined window or type of window.

11. The electronic device of claim 9, wherein the first user interface of the weather application is customized in accordance with the one or more criteria of the first context.

12. The electronic device of claim 9, the one or more programs further including instructions for:

detecting movement of the electronic device; and in accordance with detecting of movement of the electronic device, updating a location, an orientation, a size or a shape of the first user interface of the weather application.

13. The electronic device of claim 9, the one or more programs further including instructions for:

detecting one or more inputs directed to the first user interface of the weather application; and in response to detecting the one or more inputs directed to the first user interface of the weather application:

displaying a second user interface of the weather application; and ceasing displaying the first user interface of the weather application.

14. The electronic device of claim 9, the one or more programs further including instructions for:

detecting an enrolled association between a second context and a second user interface of the weather application, the second user interface different from the first user interface;

in accordance with the detection of the enrolled association between the second context and the second user interface of the weather application, determining that the second context is detected; and in accordance with the determination that the second context is detected, concurrently displaying the first user interface of the weather application and the second user interface of the weather application.

15. The electronic device of claim 9, the one or more programs further including instructions for:

detecting an enrolled association between a second context and a second user interface of a second application, the second user interface and the second application different from the first user interface and the weather application;

in accordance with the detection of the enrolled association between the second context and the second user interface, determining that the second context is detected; and in accordance with the determination that the second context is detected, concurrently displaying, using the one or more displays, the first user interface of the weather application and the second user interface of the second application.

16. The electronic device of claim 9, the one or more programs further including instructions for:

in accordance with a determination that the first context is no longer detected, ceasing displaying the first user interface of the weather application.

17. A non-transitory computer readable storage medium storing one or more programs, the one or more programs comprising instructions, which when executed by one or more processors of an electronic device including one or more input devices including one or more cameras, cause the electronic device to:

detect, using the one or more input devices including the one or more cameras, one or more physical objects in a physical environment;

detect an enrolled association between a first context and a first user interface of a weather application, the first context including detection of a window;

in accordance with the detection of the enrolled association between the first context and the first user interface of the weather application and in response to determining that one or more criteria are satisfied the one or more criteria including a criterion that is satisfied when the one or more physical objects include a detected window, determine that the first context is detected;

in accordance with the determination that the first context is detected, display, using the one or more displays, the first user interface of the weather application; and in accordance with determining that the first context is not detected, forgo displaying, using the one or more displays, the first user interface of the weather application.

18. The non-transitory computer readable storage medium of claim 17, wherein the one or more criteria include one or more of:

a criterion that is satisfied when one or more weather parameters associated with an outside environment corresponding to a location of the electronic device satisfy one or more thresholds;

a criterion that is satisfied when the one or more physical objects include one or more physical objects in an outside environment corresponding to a location of the electronic device that are visible through the window;

a criterion that is satisfied when a distance between the window and the electronic device is within a threshold distance;

a criterion that is satisfied when a direction of gaze is directed at the window or directed at a physical object that is visible through the window;

a criterion that is satisfied when a duration of gaze directed at the window for greater than a threshold duration;

criterion that is satisfied when a shape of the window corresponds to a predetermined shape, or one or more dimensions of the window are greater than one or more threshold dimensions;

a criterion that is satisfied when an orientation or viewport of the electronic device is directed at the window;

a criterion that is satisfied when a location of the electronic device is within a predetermined region of the physical environment;

a criterion that is satisfied when a time of detecting the first context corresponds to a predetermined time period; or a criterion that is satisfied when the window is a predetermined window or type of window.

19. The non-transitory computer readable storage medium of claim 17, wherein the first user interface of the weather application is customized in accordance with the one or more criteria of the first context.

20. The non-transitory computer readable storage medium of claim 17, further storing instructions which, when executed by the one or more processors, further cause the electronic device to perform:

detecting movement of the electronic device; and in accordance with detecting of movement of the electronic device, updating a location, an orientation, a size or a shape of the first user interface of the weather application.

21. The non-transitory computer readable storage medium of claim 17, further storing instructions which, when executed by the one or more processors, further cause the electronic device to perform:

detecting one or more inputs directed to the first user interface of the weather application; and in response to detecting the one or more inputs directed to the first user interface of the weather application:

displaying a second user interface of the weather application; and ceasing displaying the first user interface of the weather application.

22. The non-transitory computer readable storage medium of claim 17, further storing instructions which, when executed by the one or more processors, further cause the electronic device to perform:

detecting an enrolled association between a second context and a second user interface of the weather application, the second user interface different from the first user interface;

in accordance with the detection of the enrolled association between the second context and the second user interface of the weather application, determining that the second context is detected; and in accordance with the determination that the second context is detected, concurrently displaying the first user interface of the weather application and the second user interface of the weather application.

23. The non-transitory computer readable storage medium of claim 17, further storing instructions which, when executed by the one or more processors, further cause the electronic device to perform:

detecting an enrolled association between a second context and a second user interface of a second application, the second user interface and the second application different from the first user interface and the weather application;

in accordance with the detection of the enrolled association between the second context and the second user interface, determining that the second context is detected; and in accordance with the determination that the second context is detected, concurrently displaying, using the one or more displays, the first user interface of the weather application and the second user interface of the second application.

24. The non-transitory computer readable storage medium of claim 17, further storing instructions which, when executed by the one or more processors, further cause the electronic device to perform:

in accordance with a determination that the first context is no longer detected, ceasing displaying the first user interface of the weather application.

* * * * *